US012621584B2

(12) United States Patent
Lee et al.

(10) Patent No.: US 12,621,584 B2
(45) Date of Patent: May 5, 2026

(54) IMAGE SENSOR AND OPERATING METHOD THEREOF

(71) Applicant: SAMSUNG ELECTRONICS CO., LTD., Suwon-si (KR)

(72) Inventors: Jeisung Lee, Suwon-si (KR); Kyeongjong Lim, Suwon-si (KR); Yohan Roh, Suwon-si (KR); Youngil Seo, Suwon-si (KR); Deokha Shin, Suwon-si (KR); Chanwoo Ahn, Suwon-si (KR); Hansol Lee, Suwon-si (KR); Yeolmin Seong, Suwon-si (KR); Jeongguk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 18/606,743

(22) Filed: Mar. 15, 2024

(65) Prior Publication Data

US 2024/0323559 A1     Sep. 26, 2024

(30) Foreign Application Priority Data

Mar. 24, 2023   (KR) ........................ 10-2023-0039004
Apr. 5, 2023    (KR) ........................ 10-2023-0044791

(51) Int. Cl.
*H04N 25/683*     (2023.01)
*H04N 25/78*      (2023.01)

(52) U.S. Cl.
CPC .......... *H04N 25/683* (2023.01); *H04N 25/78* (2023.01)

(58) Field of Classification Search
CPC ....... H04N 25/68; H04N 25/683; H04N 25/78
See application file for complete search history.

(56) References Cited

U.S. PATENT DOCUMENTS

| | | | | |
|---|---|---|---|---|
| 10,027,901 | B2 * | 7/2018 | Venkataraman ..... | H04N 25/131 |
| 10,127,642 | B2 | 11/2018 | Cresens et al. | |
| 10,303,965 | B2 * | 5/2019 | Schafer ............. | G06F 18/24133 |
| 10,542,184 | B2 | 1/2020 | Yokoyama et al. | |
| 10,950,199 | B1 | 3/2021 | Buckley et al. | |
| 11,361,398 | B2 * | 6/2022 | Lee ......................... | G06F 18/23 |
| 11,468,540 | B2 | 10/2022 | An et al. | |
| 11,688,047 | B2 * | 6/2023 | Lee ..................... | G06F 18/2431 |
| | | | | 382/224 |
| 2014/0139643 | A1 * | 5/2014 | Hogasten ............ | H10F 39/8057 |
| | | | | 348/48 |
| 2018/0007284 | A1 * | 1/2018 | Venkataraman ..... | H04N 25/131 |
| 2019/0130522 | A1 * | 5/2019 | Lee ........................... | G06T 5/70 |
| 2022/0005168 | A1 | 1/2022 | Kim et al. | |

* cited by examiner

*Primary Examiner* — Amy R Hsu
(74) *Attorney, Agent, or Firm* — Sughrue Mion, PLLC

(57)     ABSTRACT

An electronic device may include a first defective pixel corrector configured to correct pixel values of defective pixels among the plurality of pixels by using pixel values of neighboring pixels of each of the defective pixels and generate first pixel data, the pixel values of the defective pixels being included in the image data, and a second defective pixel corrector configured to correct a pixel value of a cluster of defective pixels by using a neural network and generate second pixel data, the pixel value of the cluster of defective pixels being included in the image data, and the neural network being trained to correct the cluster of defective pixels.

16 Claims, 14 Drawing Sheets

FIG. 12

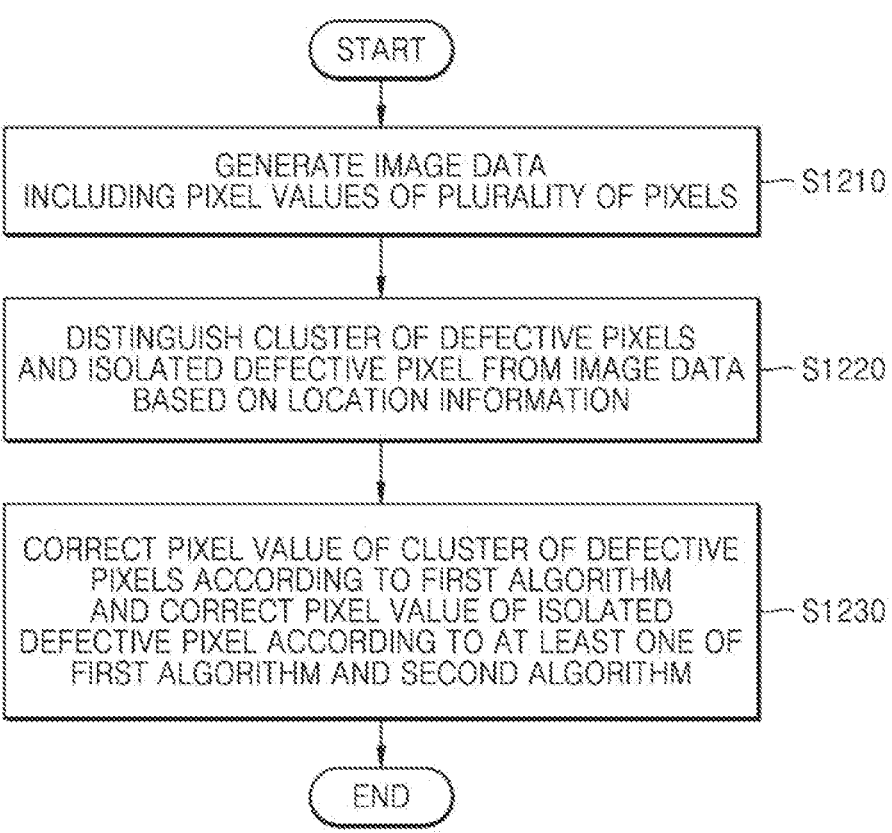

START

GENERATE IMAGE DATA
INCLUDING PIXEL VALUES OF PLURALITY OF PIXELS — S1210

DISTINGUISH CLUSTER OF DEFECTIVE PIXELS
AND ISOLATED DEFECTIVE PIXEL FROM IMAGE DATA — S1220
BASED ON LOCATION INFORMATION

CORRECT PIXEL VALUE OF CLUSTER OF DEFECTIVE
PIXELS ACCORDING TO FIRST ALGORITHM
AND CORRECT PIXEL VALUE OF ISOLATED — S1230
DEFECTIVE PIXEL ACCORDING TO AT LEAST ONE OF
FIRST ALGORITHM AND SECOND ALGORITHM

END

IMAGE SENSOR AND OPERATING METHOD THEREOF

CROSS-REFERENCE TO RELATED APPLICATION

This application is based on and claims priority under 35 U.S.C. § 119 to Korean Patent Application No. 10-2023-0039004, filed on Mar. 24, 2023, and Korean Patent Application No. 10-2023-0044791, filed on Apr. 5, 2023, in the Korean Intellectual Property Office, the disclosures of which are incorporated by reference herein in their entireties.

BACKGROUND

The present disclosure relates to an image sensor, and more particularly, to an image sensor for correcting pixel values of defective pixels based on at least one of pixel values of neighboring pixels of the defective pixels and deep learning.

Image sensors are devices that capture a two-dimensional (2D) or three-dimensional (3D) image of an object. Image sensors generate an image of an object by using a photoelectric conversion element that reacts to the intensity of light reflected from the object.

Recently, as the demand for high-quality and high-definition photos or videos has increased, a large number of pixels have been integrated in a pixel array to increase the resolution of an image sensor, and thus, pixels have been miniaturized. Due to process issues, defective pixels may occur at specific locations in the pixel array. Because a large number of defective pixels of any form are not used to generate photos or videos, the performance of the image sensor may be degraded.

Deep learning (neural network) technology is a technology for extracting valid information from input data by using a trained neural network. Although the deep learning technology may be used in correcting defective pixels, real-time processing may be difficult due to an excessive amount of computation, a large amount of power may be consumed to process the large amount of computation, and costs in correcting defective pixels may be increased.

Accordingly, there is a need for a technique for reducing costs incurred in correcting defective pixels and improving the performance of correcting defective pixels.

SUMMARY

Embodiments of the present disclosure provide an image sensor having improved performance by correcting pixel values of defective pixels. In particular, the image sensor may correct pixel values of a cluster of defective pixels and an isolated defective pixel according to a first algorithm and may correct the pixel values of the cluster of defective pixels according to a second algorithm based on deep learning, and an operating method of the image sensor.

According to an aspect of the present disclosure, an electronic device may include: a pixel array including a plurality of pixels, each of the plurality of pixels being configured to convert a received optical signal into an electrical signal; a readout circuit configured to convert the electrical signal into image data and output the image data, the image data including pixel values of the plurality of pixels; and one or more processors including: a first defective pixel corrector configured to correct pixel values of defective pixels among the plurality of pixels by using pixel values of neighboring pixels of each of the defective pixels and generate first pixel data to be included in the image data; and a second defective pixel corrector configured to correct a pixel value of a cluster of defective pixels by using a neural network and generate second pixel data, the pixel value of the cluster of defective pixels to be included in the image data.

According to another aspect of the present disclosure, an electronic device may include: a pixel array including a plurality of pixels, each of the plurality of pixels being configured to convert a received optical signal into an electrical signal; a readout circuit configured to convert the electrical signal into image data and output the image data, the image data including pixel values of the plurality of pixels; and one or more processors configured to correct at least one of a pixel value of a cluster of defective pixels and a pixel value of an isolated defective pixel in the image data, based on location information indicating locations of the cluster of defective pixels and the isolated defective pixel in the pixel array, wherein the one or more processors are further configured to correct the pixel value of the cluster of defective pixels and the pixel value of the isolated defective pixel, according to a first algorithm using pixel values of neighboring pixels of each of the cluster of defective pixels and the isolated defective pixel, and correct the pixel value of the cluster of defective pixels based on the second algorithm using a neural network trained to correct the cluster of defective pixels.

According to another aspect of the present disclosure, an operating method of an electronic device including a plurality of pixels, may include: generating image data including pixel values of the plurality of pixels based on an electrical signal obtained by converting a received optical signal; distinguishing a cluster of defective pixels and an isolated defective pixel from the image data based on location information indicating locations of the cluster of defective pixels and the isolated defective pixel among the plurality of pixels; and correcting a pixel value of the isolated defective pixel according to a first algorithm and correcting a pixel value of the cluster of defective pixels according to at least one of the first algorithm and a second algorithm that is different from the first algorithm and uses a neural network.

BRIEF DESCRIPTION OF THE DRAWINGS

Embodiments will be more clearly understood from the following detailed description taken in conjunction with the accompanying drawings in which:

FIG. 12 is a flowchart illustrating an operating method of an image sensor according to an embodiment.

DETAILED DESCRIPTION OF THE EMBODIMENTS

Figure 1:
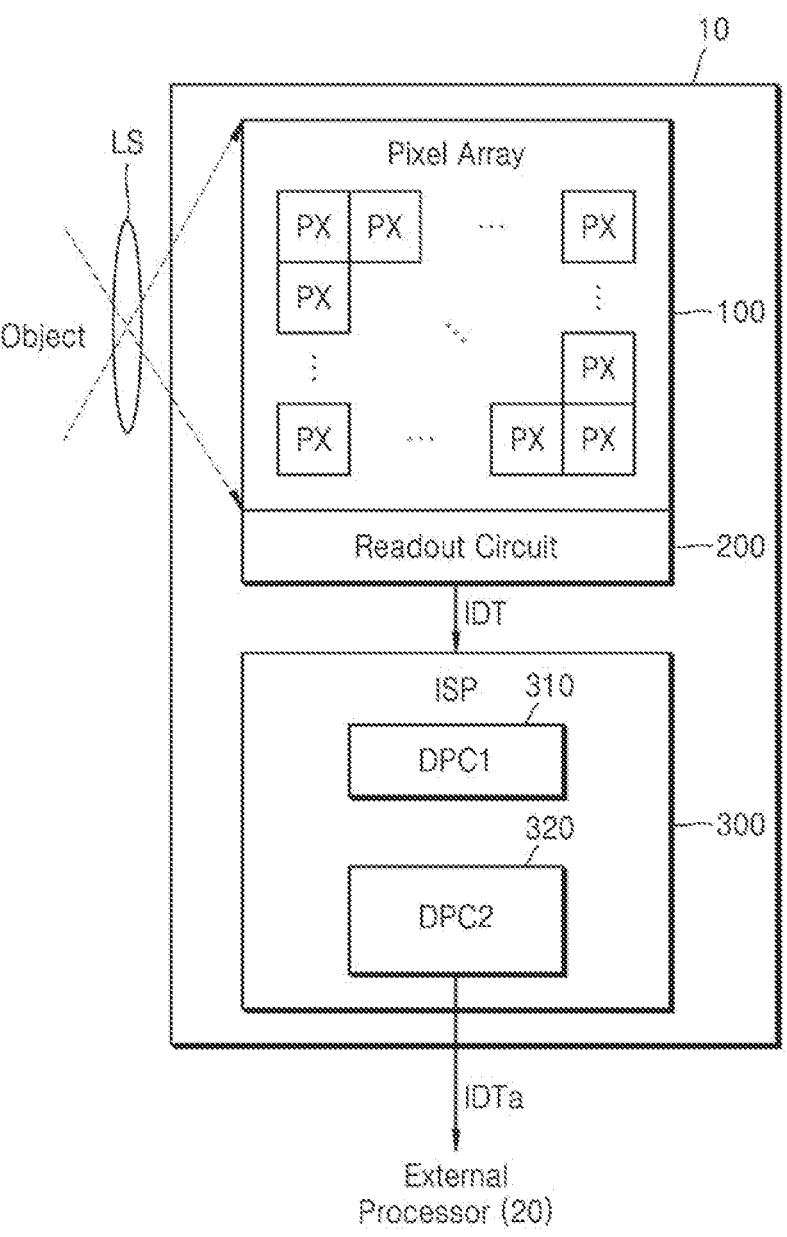
FIG. 1 is a block diagram illustrating an image sensor according to an embodiment.

Hereinafter, embodiments of the inventive concept are described in detail with reference to the accompanying drawings. The same reference numerals are used for the same components in the drawings, and redundant descriptions thereof are omitted.

As used herein, the term "circuit" refers to a software or hardware component, such as a field-programmable gate array (FPGA) or an application-specific integrated circuit (ASIC), which performs certain functions. However, the "circuit" is not limited to software or hardware. The "circuit" may be configured to reside in an addressable storage medium or may be configured to operate one or more processors. Accordingly, the "circuit" may include, for example, components, such as software components, object-oriented software components, class components, and task components, processes, functions, attributes, procedures, subroutines, segments of program code, drivers, firmware, microcode, circuits, data, databases, data structures, tables, arrays, and variables.

FIG. 1 is a block diagram illustrating an image sensor according to an embodiment.

An image sensor 10 may convert an optical signal of an object incident through an optical lens LS into image data. The image sensor 10 may be mounted on an electronic device having an image or light sensing function. For example, the image sensor 10 may be implemented as a personal computer (PC), an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, and the like. In addition, the image sensor 10 may be mounted on an electronic device, such as a drone or an advanced drivers assistance system (ADAS), or an electronic device that is provided as a component of a vehicle, furniture, manufacturing equipment, a door, and various measuring devices.

Referring to FIG. 1, the image sensor 10 may include a pixel array 100, a readout circuit 200, and an image signal processor (ISP) 300. The image sensor 10 may further include general-purpose components, such as a memory and an interface circuit, other than the pixel array 100, the readout circuit 200, and the ISP 300 illustrated in FIG. 1.

The pixel array 100 may be implemented as, for example, a photoelectric conversion element such as a charge-coupled device (CCD) or a complementary metal-oxide semiconductor (CMOS), or one of other various kinds of photoelectric conversion elements. The pixel array 100 may include a plurality of pixels PX that convert a received optical signal (light) into an electrical signal, and the plurality of pixels PX may be arranged in a matrix. Each of the plurality of pixels PX may include a photosensitive element. For example, the photosensitive element may be a photosensitive element including an organic material or an inorganic material, such as an inorganic photodiode, an organic photodiode, a perovskite photodiode, a phototransistor, a photogate, or a pinned photodiode. In an embodiment, each of the plurality of pixels PX may include a plurality of photosensitive elements.

A microlens for condensing light may be arranged above each of the plurality of pixels PX or above each of pixel groups including adjacent pixels PX. Each of the plurality of pixels PX may sense light in a particular spectral range from light received through the microlens. For example, the pixel array 100 may include a red pixel converting light in a red spectral range into an electrical signal, a green pixel converting light in a green spectral range into an electrical signal, and a blue pixel converting light in a blue spectral range into an electrical signal. However, the inventive concept is not limited thereto, and the pixel array 100 may include pixels that convert light in spectral ranges other than red, green, and blue into electrical signals. For example, the pixel array 100 may include pixels that convert light in cyan, yellow, and magenta spectral ranges into electrical signals.

The pixel array 100 may include a plurality of row lines, a plurality of column lines, a plurality of pixels PX that are arranged in a matrix form and each connected to a row line and a column line, and a color filter array arranged to correspond to each of the plurality of pixels PX. A color filter array for transmitting light in a particular spectral range may be arranged above each of the plurality of pixels PX. For example, the color filter array may have a structure in which cells having a 2×2 size and respectively including a red color pixel, a blue color pixel, and two green color pixels are repeatedly arranged. Such a pattern may be referred to as a Bayer pattern.

In another example, the color filter array may have a structure in which color pixel groups respectively corresponding to reference colors are repeatedly arranged. For example, the color filter array may have a structure in which a red color pixel group including red color pixels arranged in a 2×2 matrix, a first green color pixel group including first green color pixels arranged in a 2×2 matrix, a blue color pixel group including blue color pixels arranged in a 2×2 matrix, and a second green color pixel including second green color pixels arranged in a 2×2 matrix are repeatedly arranged. Such a pattern may be referred to as a tetra pattern.

In another example, the color filter array may have a structure in which a red color pixel group including red color pixels arranged in a 3×3 matrix, a first green color pixel group including first green color pixels arranged in a 3×3 matrix, a blue color pixel group including blue color pixels arranged in a 3×3 matrix, and a second green color pixel including second green color pixels arranged in a 3×3 matrix are repeatedly arranged. Such a pattern may be referred to as a nona pattern.

However, the inventive concept is not limited thereto, and the color filter array may have a structure in which a red color pixel group, a blue color pixel group, a first green color pixel group, and a second color pixel group each including color pixels arranged in a 2n×2n or 3n×3n matrix (where n is a positive integer) are repeatedly arranged.

In some embodiments, the plurality of pixels PX may have a multi-layer structure. The pixel PX having a multi-layer structure may include a plurality of stacked photosensitive elements that convert light in different spectral ranges into electrical signals, and electrical signals corresponding to different colors may be generated from the plurality of photosensitive elements. In other words, electrical signals corresponding to a plurality of colors may be output from one pixel PX.

The readout circuit 200 may receive a pixel signal that is an electrical signal from the pixel array 100 and convert the pixel signal into image data IDT including pixel values of the plurality of pixels PX. The image data IDT may be a signal in the form of a stream including a pixel value that is a digital value corresponding to each pixel PX of the pixel array 100. The pixel signal may include a reset signal or an image signal (or sensing signal). The readout circuit 200 may generate and output pixel values corresponding to the plurality of pixels PX by converting reset signals and image signals received from the pixel array 100 into digital signals. The readout circuit 200 may transmit the image data IDT to the ISP 300.

The ISP 300 may receive the image data IDT. The ISP 300 may perform image processing on the image data IDT. For example, the ISP 300 may perform image processing such as noise reduction processing, gain adjustment, waveform shaping processing, interpolation processing, white balance processing, gamma processing, edge enhancement processing, and binning. The ISP 300 may perform defective pixel correction on the image data IDT.

In an embodiment, the ISP 300 may detect defective pixels. The image data IDT may include pixel values caused by the defective pixels. Here, a defective pixel may refer to a pixel that does not have a pixel value corresponding to a particular gray level when a difference in pixel value between the pixel and neighboring pixels is greater than or equal to a reference value, or when the image data IDT indicates an image of the gray level. The defective pixels may include a static defective pixel that is continuously turned on or off and a dynamic defective pixel that is randomly turned on or off, among the plurality of pixels PX.

The defective pixels may include a cluster of defective pixels (also referred to as "clustered defective pixels") and an isolated defective pixel (also referred to as an isolated individual defective pixel). The cluster of defective pixels may refer to a pixel generated by clustering a plurality of adjacent defective pixels into a same group. Among the defective pixels, a pixel that does not belong to a cluster of defective pixels may be referred to as an individual defective pixel or an isolated individual defective pixel. The individual defective pixel may represent a single defective pixel or a plurality of defective pixels that are isolated or separated from each other, rather than being located adjacent to each other.

The ISP 300 may distinguish defective pixels from the image data IDT. The ISP 300 may distinguish defective pixels as a cluster of defective pixels and isolated individual defective pixels, based on location information of the defective pixels. The location information may indicate locations of the cluster of defective pixels and the isolated defective pixel among the plurality of pixels PX in the pixel array 100 and may be pre-stored in the ISP 300. For example, the ISP 300 may distinguish a pixel value of the cluster of defective pixels and a pixel value of the individual defective pixel based on the location information. However, the inventive concept is not necessarily limited thereto, and the ISP 300 may distinguish location information of a cluster of defective pixels and location information of an isolated defective pixel.

In an embodiment, the ISP 300 may perform defective pixel correction on the image data IDT. The ISP 300 may correct pixel values of defective pixels among the pixel values of the plurality of pixels PX included in the image data IDT. The ISP 300 may correct at least one of a pixel value of a cluster of defective pixels and a pixel value of an isolated defective pixel included in the image data IDT.

The ISP 300 may correct a pixel value of each of all defective pixels according to a first algorithm. The ISP 300 may correct a pixel value of a cluster of defective pixels and a pixel value of an isolated defective pixel according to the first algorithm. The first algorithm may be an algorithm that corrects pixel values of defective pixels by using pixel values of neighboring pixels of each of the defective pixels in the pixel array 100 and may use hand-crafted features. The ISP 300 may correct the pixel value of the cluster of defective pixels according to the first algorithm using pixel values of neighboring pixels of the cluster of defective pixels. The ISP 300 may correct the pixel value of the isolated defective pixel according to the first algorithm using pixel values of neighboring pixels of the isolated defective pixel.

The ISP 300 may correct a pixel value of a cluster of defective pixels according to a second algorithm. The second algorithm may be an algorithm using a neural network trained to correct the cluster of defective pixels. The ISP 300 may correct the pixel value of the cluster of defective pixels by using the neural network.

Referring to FIG. 1, the ISP 300 may include a first defective pixel corrector 310 and a second defective pixel corrector 320. The first defective pixel corrector 310 may correct pixel values of defective pixels according to the first algorithm. The first defective pixel corrector 310 may correct a pixel value of a cluster of defective pixels and a pixel value of an isolated defective pixel. The first defective pixel corrector 310 may correct the pixel value of the cluster of defective pixels by using pixel values of neighboring pixels of the cluster of defective pixels. The first defective pixel corrector 310 may correct the pixel value of the isolated defective pixel by using pixel values of neighboring pixels of the isolated defective pixel. The first defective pixel corrector 310 may generate first pixel data by correcting the pixel value of the cluster of defective pixels and the pixel value of the isolated defective pixel.

The second defective pixel corrector 320 may correct a pixel value of a cluster of defective pixels according to the second algorithm. The second defective pixel corrector 320 may correct the pixel value of the cluster of defective pixels by using a neural network trained to correct the cluster of defective pixels. The second defective pixel corrector 320 may generate second pixel data by correcting the pixel value of the cluster of defective pixels. The second defective pixel corrector 320 may also be referred to as a deep learning-based defective pixel corrector (DLDPC). The second defective pixel corrector 320 may correct pixel values of all clustered defective pixels, or may correct pixel values of some clustered defective pixels based on the time required to perform one cluster defective pixel correction according to the second algorithm. For example, while performing defective pixel correction on a first cluster of defective pixels, the second defective pixel corrector 320 may not perform defective pixel correction on other received clustered defective pixels. However, even when the second defective pixel corrector 320 does not perform defective pixel correction on the other clustered defective pixels, the first defective pixel corrector 310 may perform defective pixel correction on the other clustered defective pixels.

In an embodiment, the ISP 300 may generate corrected image data IDTa that has been image-processed based on at least one of the first pixel data and the second pixel data. The corrected image data IDTa may be image data obtained by correcting pixel values of defective pixels in the image data IDT. The corrected image data IDTa may be provided to an external processor 20 (e.g., a main processor or a graphic processor of an electronic device on which the image sensor 10 is mounted). The external processor 20 may perform image processing on the corrected image data IDTa to improve the image quality of the corrected image data IDTa or reduce the resolution of the corrected image data IDTa, and may store the corrected image data IDTa that has been image-processed, display the corrected image data IDTa on a display, or provide the corrected image data IDTa to a component that performs an operation based on the corrected image data IDTa.

In an embodiment, each of the first defective pixel corrector 310 and the second defective pixel corrector 320 may be implemented as hardware. However, the inventive concept is not limited thereto, and each of the first defective pixel corrector 310 and the second defective pixel corrector 320 may be implemented as software or a combination of hardware and software. In an embodiment, the pixel array 100, the readout circuit 200, and the ISP 300 may be implemented as a single semiconductor chip or semiconductor module. In an embodiment, the pixel array 100 and the readout circuit 200 may be implemented as one semiconductor chip, and the ISp 300 may be implemented as another semiconductor chip.

The image sensor according to an embodiment may correct the pixel values of the defective pixels according to the first algorithm and correct the pixel value of the cluster of defective pixels according to the second algorithm. Because the pixel value of the isolated defective pixel is corrected according to the first algorithm, the amount of computation and power consumption may be reduced. When correcting the defective pixels according to the second algorithm, even when the pixel value of the cluster of defective pixels is not corrected in real time according to the second algorithm due to an increase in the time required for performing the defective pixel correction, because the pixel value of the cluster of defective pixels may be corrected in real time according to the first algorithm, the amount of computation for the defective pixel correction may be reduced, and the performance for the defective pixel correction may be improved. Accordingly, an image sensor with reduced power consumption during defective pixel correction and improved performance for defective pixel correction may be provided.

While FIG. 1 illustrates the first defective pixel corrector 310 and the second defective pixel corrector 320 being part of the image signal processor 300 within the image sensor 10, embodiments of the present disclosure are not limited to this configuration. The first defective pixel corrector 310 and the second defective pixel corrector 320 may also be integrated into one or more external processors (e.g., an external processor 20) located outside the image sensor 10. For example, when a mobile device includes a camera module with an integrated image signal processor, and also includes a processor outside the camera module to process image signals output from the camera module, either one or both of the first defective pixel corrector 310 and the second defective pixel corrector 320 may be incorporated into the processor of the mobile device.

Figure 2:
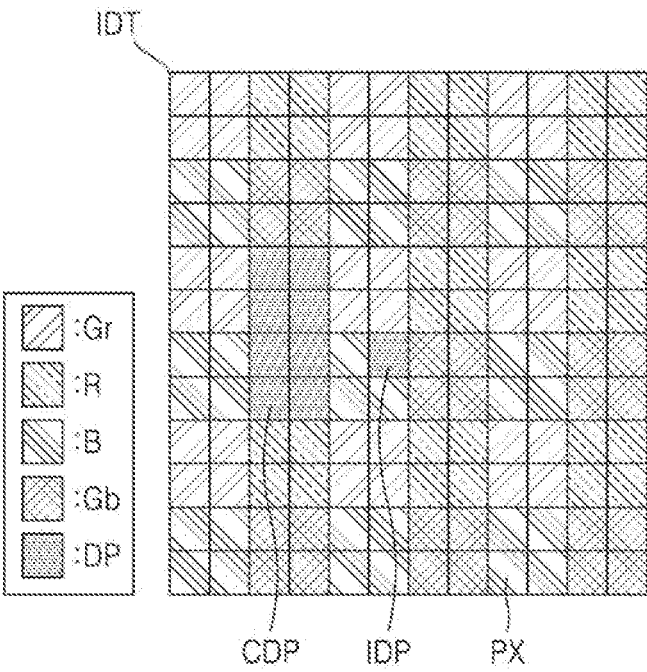
FIG. 2 is a diagram illustrating a defective pixel according to an embodiment.

FIG. 2 is a diagram illustrating a defective pixel according to an embodiment. FIG. 2 illustrates the image data IDT to which each of a plurality of pixels PX of a pixel array (e.g., the pixel array 100 of FIG. 1) corresponds. The image data IDT may include pixel values respectively corresponding to the plurality of pixels PX. Herein, a pixel value corresponding to the pixel PX may be referred to as a pixel value of the pixel PX. Descriptions already provided with reference to FIG. 1 are omitted.

Referring to FIG. 2, the image data IDT may include pixel values of the plurality of pixels PX. The image data IDT may include pixel values respectively corresponding to first green pixels Gr, red pixels R, blue pixels B, and second green pixels Gb. Although FIG. 2 illustrates a tetra pattern in which a red pixel group including the red pixels R arranged in a 2×2 matrix, a first green pixel group including the first green pixels Gr arranged in a 2×2 matrix, a blue pixel group including the blue pixels B arranged in a 2×2 matrix, and a second green pixel group including the second green pixels Gb arranged in a 2×2 matrix are repeatedly arranged, this is an example, and the inventive concept is not necessarily limited thereto. The image data IDT may include the pixel values of the plurality of pixels PX forming various patterns.

The image data IDT may include a pixel value of at least one defective pixel DP. The image data IDT may include a pixel value of a cluster of defective pixels CDP and a pixel value of an isolated (individual) defective pixel IDP. The cluster of defective pixels CDP may be one or more pixels that belong to a group of defective pixels that are adjacent to each other form a cluster. For example, the cluster of defective pixels CDP may include 8 defective pixels DP adjacent to each other. The cluster of defective pixels CDP may include the defective pixels DP in a 2×4 matrix. However, the inventive concept is not necessarily limited thereto, and various numbers of defective pixels DP may form a cluster.

The isolated defective pixel IDP is a defective pixel DB that is separated or isolated from other defective pixels and therefore do not form a cluster. The isolated individual defective pixel IDP may not belong to the cluster of defective pixels CDP. The isolated defective pixel IDP may be a single defective pixel DP that does not belong to the cluster of defective pixels CDP. However, the inventive concept is not necessarily limited thereto, and the isolated defective pixel IDP may include two defective pixels DP adjacent to each other. The cluster of defective pixels CDP may be arranged apart from the isolated defective pixel IDP by at least one pixel unit, or may be arranged adjacent to the isolated defective pixel IDP.

Although FIG. 2 illustrates one cluster of defective pixels CDP and one isolated defective pixel IDP, the inventive concept is not necessarily limited thereto. The pixel array may include at least one of the cluster of defective pixels CDP and the isolated defective pixel IDP, or may include one or more clusters of defective pixels CDP and one or more isolated defective pixels IDP.

Figure 3:
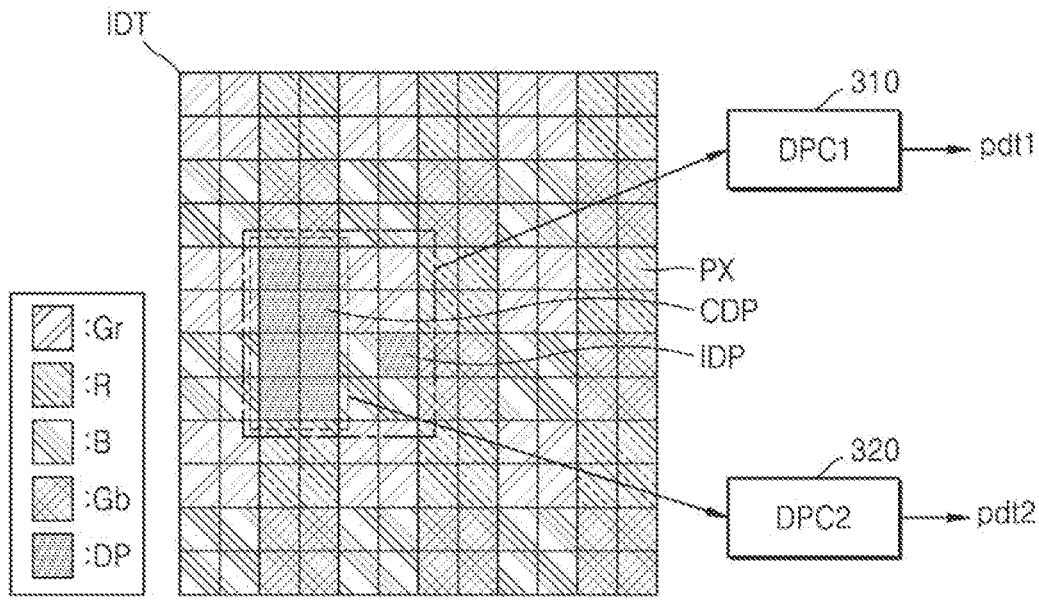
FIG. 3 is a diagram illustrating operations of a first defective pixel corrector and a second defective pixel corrector according to an embodiment.

FIG. 3 is a diagram illustrating operations of a first defective pixel corrector and a second defective pixel corrector according to an embodiment. Descriptions already provided above are omitted.

An ISP (e.g., the ISP 300 of FIG. 1) may distinguish defective pixels from the image data IDT. The ISP may distinguish the cluster of defective pixels CDP and the isolated defective pixel IDP based on location information. For example, the ISP may distinguish the pixel value of the cluster of defective pixels CDP and the pixel value of the isolated defective pixel IDP and transmit the pixel value of the cluster of defective pixels CDP and the pixel value of the isolated defective pixel IDP to the first defective pixel corrector 310. The ISP may transmit the pixel value of the cluster of defective pixels CDP to the second defective pixel corrector 320. However, the inventive concept is not necessarily limited thereto, and the ISP may distinguish location information of the cluster of defective pixels CDP and location information of the isolated defective pixel IDP. For example, the image data IDT and the location information of the cluster of defective pixels CDP and isolated defective pixel IDP may be transmitted to the first defective pixel corrector 310. The image data IDT and the location information of the cluster of defective pixels CDP may be transmitted to the second defective pixel corrector 320.

The first defective pixel corrector 310 may correct the pixel values of the defective pixels DP according to the first algorithm. The first defective pixel corrector 310 may correct the pixel value of the cluster of defective pixels CDP and the pixel value of the isolated defective pixel IDP. The first defective pixel corrector 310 may correct the pixel value of the cluster of defective pixels CDP by using pixel values of neighboring pixels of the cluster of defective pixels CDP. The first defective pixel corrector 310 may correct the pixel value of the isolated defective pixel IDP by using pixel values of neighboring pixels of the isolated defective pixel IDP. The first defective pixel corrector 310 may generate first pixel data pdt1 by correcting the pixel values of the cluster of defective pixels CDP and the isolated defective pixel IDP. The first defective pixel corrector 310 is described below in detail with reference to FIG. 4.

The second defective pixel corrector 320 may correct the pixel value of the cluster of defective pixels CDP according to the second algorithm. The second defective pixel corrector 320 may correct the pixel value of the cluster of defective pixels CDP by using a neural network trained to correct the cluster of defective pixels CDP. The second defective pixel corrector 320 may generate second pixel data pdt2 by correcting the pixel value of the cluster of defective pixels CDP. The second defective pixel corrector 320 is described below in detail with reference to FIG. 5.

Figure 4:
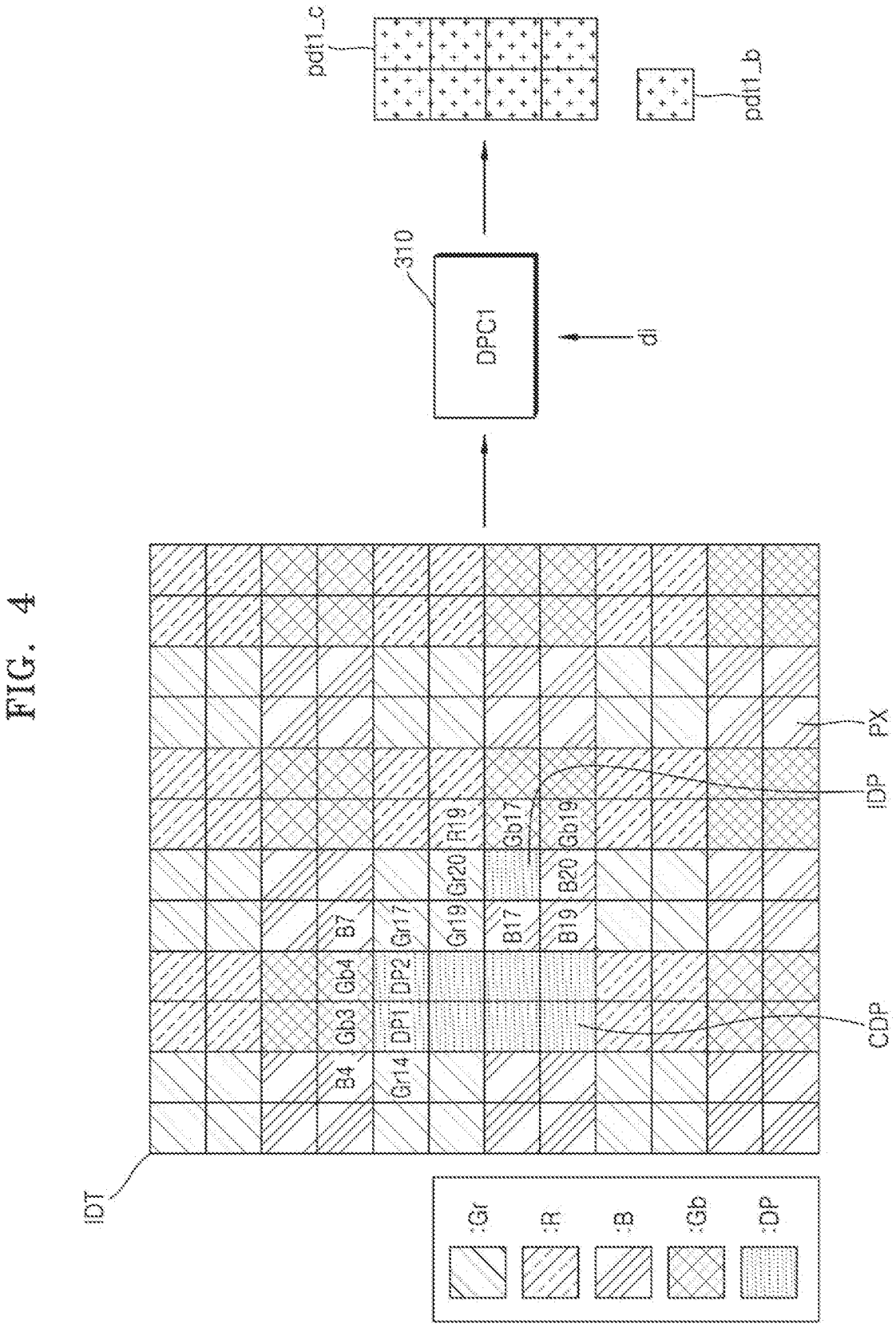
FIG. 4 is a diagram illustrating a first defective pixel corrector according to an embodiment.

FIG. 4 is a diagram illustrating a first defective pixel corrector according to an embodiment.

Referring to FIG. 4, the first defective pixel corrector 310 may correct the pixel value of the defective pixel DP with respect to the image data IDT. The first defective pixel corrector 310 may correct the pixel values of the cluster of defective pixels CDP and the isolated defective pixel IDP based on the image data IDT and location information di. The first defective pixel corrector 310 may receive the image data IDT and the location information di for the defective pixel DP. The first defective pixel corrector 310 may perform defective pixel correction on the pixel value of the cluster of defective pixels CDP and the pixel value of the isolated defective pixel IDP based on the image data IDT and the location information di. Referring to FIG. 4, the defective pixel DP may include the cluster of defective pixels CDP and the isolated defective pixel IDP, and the first defective pixel corrector 310 may receive the location information di for the cluster of defective pixels CDP and the isolated defective pixel IDP. However, the inventive concept is not necessarily limited thereto, and the first defective pixel corrector 310 may receive only the image data IDT corresponding to the defective pixel DP. That is, the first defective pixel corrector 310 may receive the pixel value of the cluster of defective pixels CDP and the pixel value of the isolated defective pixel IDP. The first defective pixel corrector 310 may perform defective pixel correction on the pixel value of the cluster of defective pixels CDP and the pixel value of the isolated defective pixel IDP.

The location information di may indicate the location of the defective pixel DP. For example, the location information di may be a defective pixel map indicating the defective pixel DP among the plurality of pixels PX. For example, the location information di may be a flag indicating the defective pixel DP. The flag may include a plurality of bits, wherein a bit corresponding to the defective pixel DP may include a flag value (e.g., "1") indicating the defective pixel DP, and the other bits may include a flag value (e.g., "0") indicating a normal pixel that is not the defective pixel DP. The location information di may also include an identification factor for identifying whether the defective pixel DP is the cluster of defective pixels CDP or the isolated defective pixel IDP.

The first defective pixel corrector 310 may correct the pixel values of the defective pixels DP according to the first algorithm. The first defective pixel corrector 310 may correct the pixel value of the cluster of defective pixels CDP by using pixel values of neighboring pixels of the cluster of defective pixels CDP. A neighboring pixel is a pixel in the periphery of a specific pixel, and may be a pixel adjacent to the specific pixel or a pixel arranged within a certain distance from the specific pixel.

For example, the neighboring pixels of the cluster of defective pixels CDP may include a blue pixel B4, a second green pixel Gb3, and a first green pixel Gr14. In the cluster of defective pixels CDP, a pixel value of a first defective pixel DP1 that is adjacent to the blue pixel B4, the second green pixel Gb3, and the first green pixel Gr14 may be corrected based on a pixel value of each of the blue pixel B4, the second green pixel Gb3, and the first green pixel Gr14. For example, the neighboring pixels of the cluster of defective pixels CDP may include a blue pixel B7, a second green pixel Gb4, and a first green pixel Gr17. A pixel value of a second defective pixel DP2 included in the cluster of defective pixels CDP may be corrected based on a pixel value of each of the blue pixel B7, the second green pixel Gb4, and the first green pixel Gr17.

The first defective pixel corrector 310 may correct the pixel value of the isolated defective pixel IDP by using pixel values of neighboring pixels of the isolated defective pixel IDP. For example, the neighboring pixels of the isolated defective pixel IDP may include first green pixels Gr19 and Gr20, a red pixel R19, blue pixels B17, B19, and B20, and second green pixels Gb17 and Gb19. The pixel value of the isolated defective pixel IDP may be corrected based on a pixel value of each of the neighboring pixels of the isolated defective pixel IDP.

In an embodiment, the first defective pixel corrector 310 may correct the pixel values of the defective pixels DP based on at least one of a mean filter, a median filter, and a weighted mean filter.

The mean filter is a method of obtaining a mean within a certain mask. The first defective pixel corrector 310 may correct the pixel value of the defective pixel DP to a mean value of pixel values of neighboring pixels of the defective pixel DP by using the mean filter. For example, the first defective pixel corrector 310 may correct the pixel value of the isolated defective pixel IDP to a mean value of the pixel values of the first green pixels Gr19 and Gr20, the red pixel R19, the blue pixels B17, B19, and B20, and the second green pixels Gb17 and Gb19, which are the neighboring pixels of the isolated defective pixel IDP.

The median filter is a method of arranging values within a certain mask in order to obtain a median value. The first defective pixel corrector 310 may correct the pixel value of the defective pixel DP to a median value of pixel values of neighboring pixels of the defective pixel DP by using the median filter.

The weighted mean filter is a method of using a mean and variance of values within a certain mask. The first defective pixel corrector 310 may correct the pixel value of the defective pixel DP to a weighted mean value of pixel values of neighboring pixels of the defective pixel DP by using the weighted mean filter.

The first defective pixel corrector 310 may generate first pixel data pdt1_c and pdt1_b by correcting the pixel value of the cluster of defective pixels CDP and the pixel value of the isolated defective pixel IDP. The first pixel data pdt1_c may be a corrected pixel value corresponding to the cluster of defective pixels CDP, and the first pixel data pdt1_b may be a corrected pixel value corresponding to the isolated defective pixel IDP. The first pixel data pdt1_c may include corrected pixel values respectively corresponding to the defective pixels DP included in the cluster of defective pixels CDP.

Figure 5:
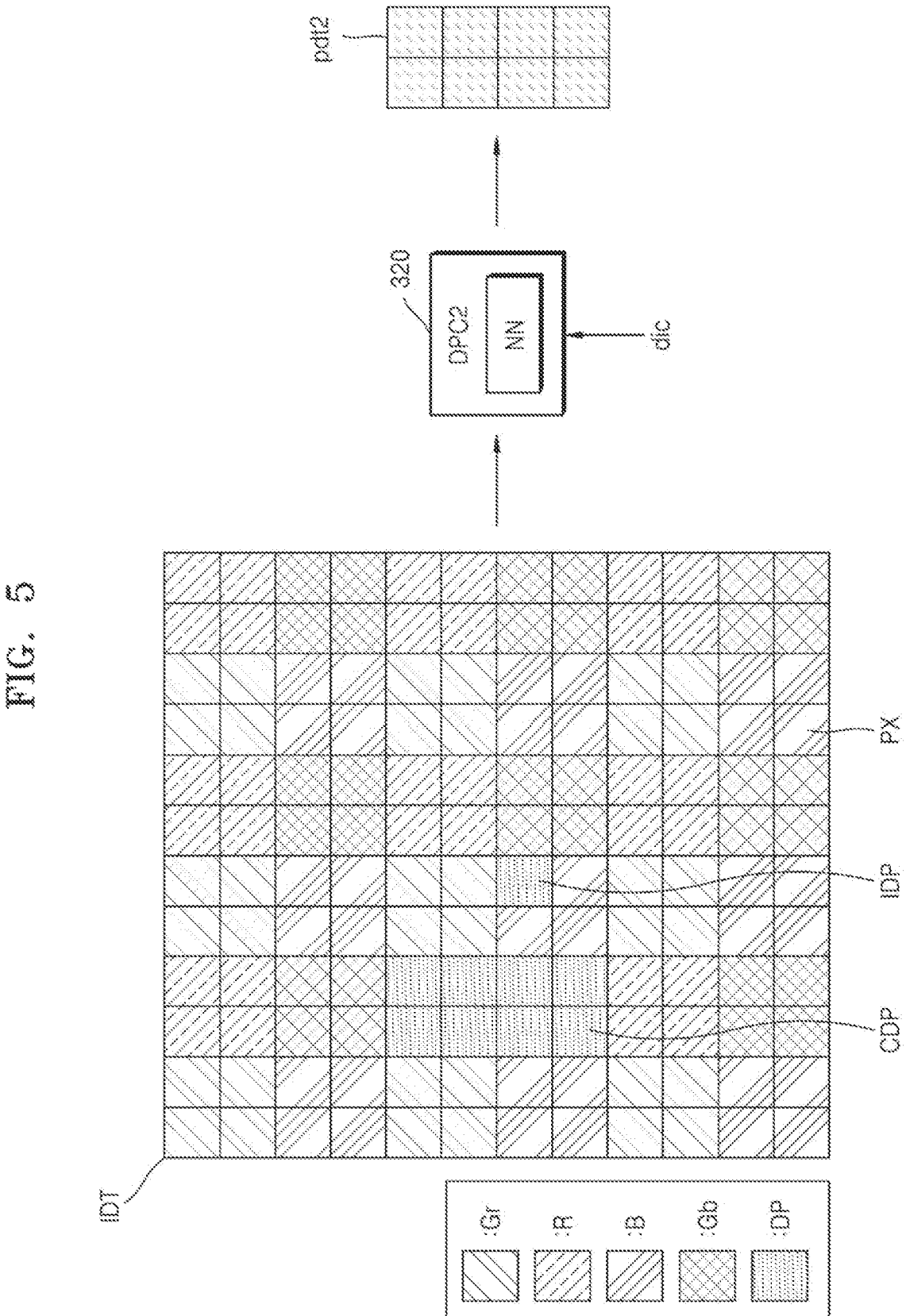
FIG. 5 is a diagram illustrating a second defective pixel corrector according to an embodiment.

FIG. 5 is a diagram illustrating a second defective pixel corrector according to an embodiment. Descriptions already provided above are omitted.

Referring to FIG. 5, the second defective pixel corrector 320 may correct the pixel value of the defective pixel DP with respect to the image data IDT. The second defective pixel corrector 320 may correct the pixel value of the cluster of defective pixels CDP based on the image data IDT and location information dic.

The second defective pixel corrector 320 may receive the image data IDT and the location information dic for the cluster of defective pixels CDP. Referring to FIG. 5, the defective pixel DP may include the cluster of defective pixels CDP and the isolated defective pixel IDP, but the second defective pixel corrector 320 may receive the location information dic for the cluster of defective pixels CDP. However, the inventive concept is not necessarily limited thereto, and the second defective pixel corrector 320 may receive only the image data IDT corresponding to the cluster of defective pixels CDP. That is, the second defective pixel corrector 320 may receive the pixel value of the cluster of defective pixels CDP and may not receive the location information dic.

The location information dic may indicate the location of the cluster of defective pixels CDP. The location information dic may be location information corresponding to the cluster of defective pixels CDP among the location information of the defective pixel DP. For example, the location information dic may be a defective pixel map indicating the cluster of defective pixels CDP among the plurality of pixels PX. For example, the location information dic may be a flag indicating the cluster of defective pixels CDP.

The second defective pixel corrector 320 may correct the pixel value of the cluster of defective pixels CDP according to the second algorithm. The second defective pixel corrector 320 may include a neural network NN. The neural network NN may generate the second pixel data pdt2 by performing defective pixel processing on the pixel value of the cluster of defective pixels CDP.

The neural network NN may include a deep learning model trained to correct the cluster of defective pixels CDP. The deep learning model may include a plurality of layers, for example, first to nth layers. In an embodiment, the neural network NN may include a deep learning model trained to correct the cluster of defective pixels CDP based on training data of various cases including the cluster of defective pixels CDP. For example, the neural network NN may include a deep learning model trained to correct the cluster of defective pixels CDP based on training data including the pixel values of the defective pixels DP arranged in a 2×4 matrix.

In some embodiments, the neural network NN may include at least one convolutional layer and at least one fully connected layer, and the image data IDT and the location information dic may be provided to the neural network NN.

The second defective pixel corrector 320 may generate the second pixel data pdt2 by correcting the pixel value of the cluster of defective pixels CDP. The second pixel data pdt2 may be a corrected pixel value corresponding to the cluster of defective pixels CDP. The second pixel data pdt2 may include corrected pixel values respectively corresponding to the defective pixels DP included in the cluster of defective pixels CDP.

Figure 6:
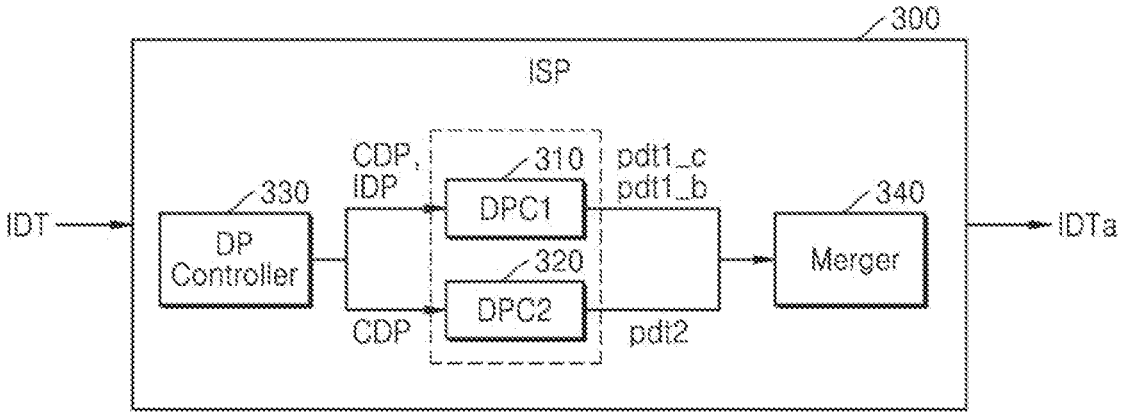
FIG. 6 is a block diagram illustrating an image signal processor according to an embodiment.

FIG. 6 is a block diagram illustrating an ISP according to an embodiment. Because the ISP 300, the first defective pixel corrector 310, and the second defective pixel corrector 320 of FIG. 6 respectively correspond to the ISP 300, the first defective pixel corrector 310, and the second defective pixel corrector 320 of FIG. 1, redundant descriptions thereof are omitted.

Referring to FIG. 6, the ISP 300 may include a defective pixel controller 330, the first and second defective pixel correctors 310 and 320, and a merger 340. The defective pixel controller 330 may distinguish defective pixels from the image data IDT. The defective pixel controller 330 may distinguish the cluster of defective pixels CDP and the isolated defective pixel IDP based on location information. The location information may be pre-stored in the ISP 300. However, the inventive concept is not limited thereto, and the location information may be pre-stored outside the ISP 300.

For example, the defective pixel controller 330 distinguish the pixel value of the cluster of defective pixels CDP and the pixel value of the isolated defective pixel IDP and transmit the pixel value of the cluster of defective pixels CDP and the pixel value of the isolated defective pixel IDP to the first defective pixel corrector 310. The defective pixel controller 330 may distinguish the pixel value of the cluster of defective pixels CDP and transmit the pixel value of the cluster of defective pixels CDP to the second defective pixel corrector 320.

For example, the defective pixel controller 330 may distinguish location information of the cluster of defective pixels CDP and location information of the isolated defective pixel IDP. The defective pixel controller 330 may transmit the image data IDT and the location information of the cluster of defective pixels CDP and isolated defective pixel IDP to the first defective pixel corrector 310. The defective pixel controller 330 may transmit the image data IDT and the location information of the cluster of defective pixels CDP to the second defective pixel corrector 320.

The first defective pixel corrector 310 may correct the pixel value of the cluster of defective pixels CDP and the pixel value of the isolated defective pixel IDP according to the first algorithm. The second defective pixel corrector 320 may correct the pixel value of the cluster of defective pixels CDP. The first defective pixel corrector 310 may generate the first pixel data pdt1_c and pdt1_d and transmit the first pixel data pdt1_c and pdt1_d to the merger 340. The second defective pixel corrector 320 may generate the second pixel data pdt2 and transmit the second pixel data pdt2 to the merger 340. The first defective pixel corrector 310 and the second defective pixel corrector 320 may be implemented as a single semiconductor chip or as separate semiconductor chips.

The merger 340 may generate the corrected image data IDTa based on pixel data received from at least one of the first defective pixel corrector 310 and the second defective pixel corrector 320. The corrected image data IDTa may be obtained by correcting a pixel value of a defective pixel in the image data IDT based on the pixel data. The corrected image data IDTa may be obtained by correcting the pixel values of the isolated defective pixel IDP and the cluster of defective pixels CDP in the image data IDT based on the pixel data.

The merger 340 may correct the pixel value of the isolated defective pixel IDP based on the first pixel data pdt1_b. For example, the merger 340 may replace the pixel value of the isolated defective pixel IDP in the image data IDT with the first pixel data pdt1_b. The merger 340 may generate the corrected image data IDTa in which the pixel value of the isolated defective pixel IDP is replaced with the first pixel data pdt1_b.

The merger 340 may correct the pixel value of the cluster of defective pixels CDP based on at least one of the first pixel data pdt1_c and the second pixel data pdt2. For example, the merger 340 may replace the pixel value of the cluster of defective pixels CDP in the image data IDT with the first pixel data pdt1_c or may replace the pixel value of the cluster of defective pixels CDP with the second pixel data pdt2. However, the inventive concept is not necessarily limited thereto, and the merger 340 may replace the pixel value of the cluster of defective pixels CDP with a value obtained by merging the first pixel data pdt1_c and the second pixel data pdt2.

In an embodiment, when the first defective pixel corrector 310 generates the first pixel data pdt1_c corresponding to the cluster of defective pixels CDP and the second defective pixel corrector 320 generates the second pixel data pdt2 corresponding to the cluster of defective pixels CDP, the merger 340 may generate the corrected image data IDTa based on the second pixel data pdt2 among the first pixel data pdt1_c and the second pixel data pdt2 corresponding to the cluster of defective pixels CDP.

The merger 340 may receive the first pixel data pdt1_c and the second pixel data pdt2 corresponding to the cluster of defective pixels CDP. When each of the first defective pixel corrector 310 and the second defective pixel corrector 320 completes defective pixel correction for the pixel value of the cluster of defective pixels CDP, the pixel data may be transmitted to the merger 340. When the merger 340 receives the first pixel data pdt1_c and the second pixel data pdt2, the merger 340 may select the second pixel data pdt2 from among the first pixel data pdt1_c and the second pixel data pdt2 and generate the corrected image data IDTa by replacing the pixel value of the cluster of defective pixels CDP with the second pixel data pdt2.

In an embodiment, when the first defective pixel corrector 310 generates the first pixel data pdt1_c corresponding to the cluster of defective pixels CDP and the second defective pixel corrector 320 does not generate the second pixel data pdt2 corresponding to the cluster of defective pixels CDP, the merger 340 may generate the corrected image data IDTa based on the first pixel data pdt1_c corresponding to the cluster of defective pixels CDP. For example, the merger 340 may generate the corrected image data IDTa by replacing the pixel value of the cluster of defective pixels CDP with the first pixel data pdt1_c.

The merger 340 may not receive the second pixel data pdt2. Because the second defective pixel corrector 320 performs defective pixel correction by using a neural network, the amount of computation may be relatively large. For example, while the second defective pixel corrector 320 operates to correct a pixel value of a first cluster of defective pixels, it may be difficult to correct a pixel value of a second cluster of defective pixels received by the second defective pixel corrector 320. Accordingly, the pixel value of the second cluster of defective pixels may be corrected by the first defective pixel corrector 310, and the merger 340 may receive the first pixel data pdt1_c corresponding to the second cluster of defective pixels. The merger 340 may not receive the second pixel data pdt2 corresponding to the second cluster of defective pixels.

Because the merger 340 receives the first pixel data pdt1_c corresponding to the second cluster of defective pixels and fails to receive the second pixel data pdt2 corresponding to the second cluster of defective pixels, the merger 340 may generate the corrected image data IDTa based on the first pixel data pdt1_c. The merger 340 may replace the pixel value of the cluster of defective pixels CDP of the image data IDT with the first pixel data pdt1_c. The merger 340 may generate the corrected image data IDTa including the first pixel data pdt1_c and the first pixel data pdt1_b.

Figure 7:
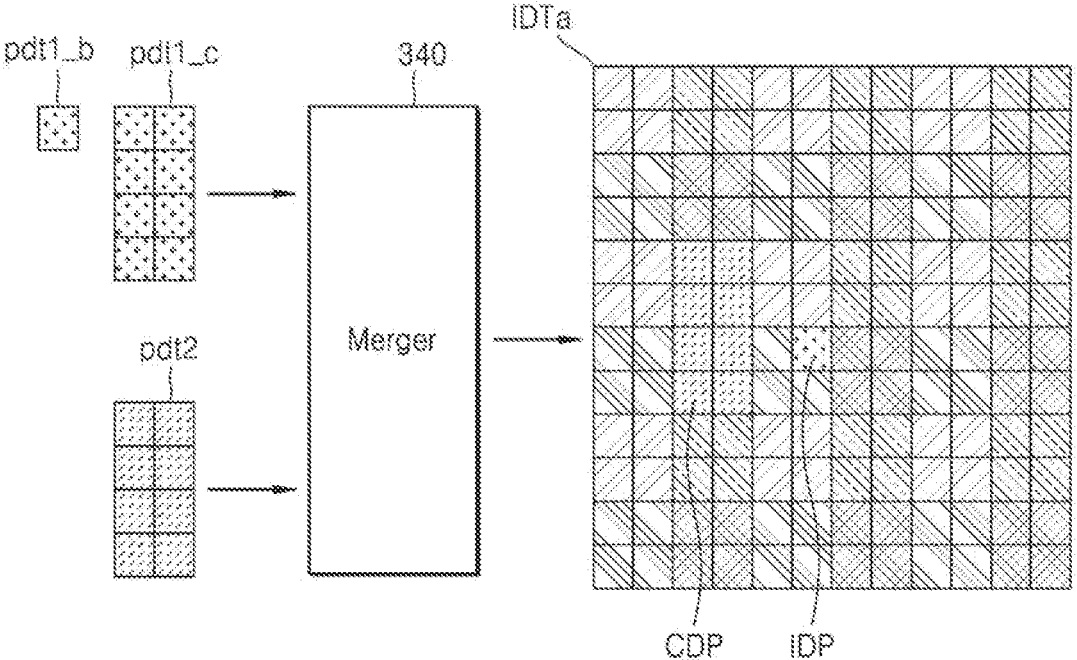
FIG. 7 is a diagram illustrating an operation of a merger according to an embodiment.

FIG. 7 is a diagram illustrating an operation of a merger according to an embodiment. In detail, FIG. 7 illustrates a case in which the merger 340 receives the first pixel data pdt1_c and pdt1_b and the second pixel data pdt2. Descriptions already provided above are omitted.

The merger 340 may receive the first pixel data pdt1_c and pdt1_b and the second pixel data pdt2. The merger 340 may replace the pixel value of the isolated defective pixel IDP in the image data IDT with the first pixel data pdt1_b. The merger 340 may generate the corrected image data IDTa in which the pixel value of the isolated defective pixel IDP is replaced with the first pixel data pdt1_b.

When the merger 340 receives the first pixel data pdt1_c and the second pixel data pdt2, the merger 340 may select the second pixel data pdt2 from among the first pixel data pdt1_c and the second pixel data pdt2 and generate the corrected image data IDTa by replacing the pixel value of the cluster of defective pixels CDP with the second pixel data pdt2. The corrected image data IDTa may include the first pixel data pdt1_b obtained by replacing the pixel value of the isolated defective pixel IDP and the second pixel data pdt2 obtained by replacing the pixel value of the cluster of defective pixels CDP.

Figure 8:
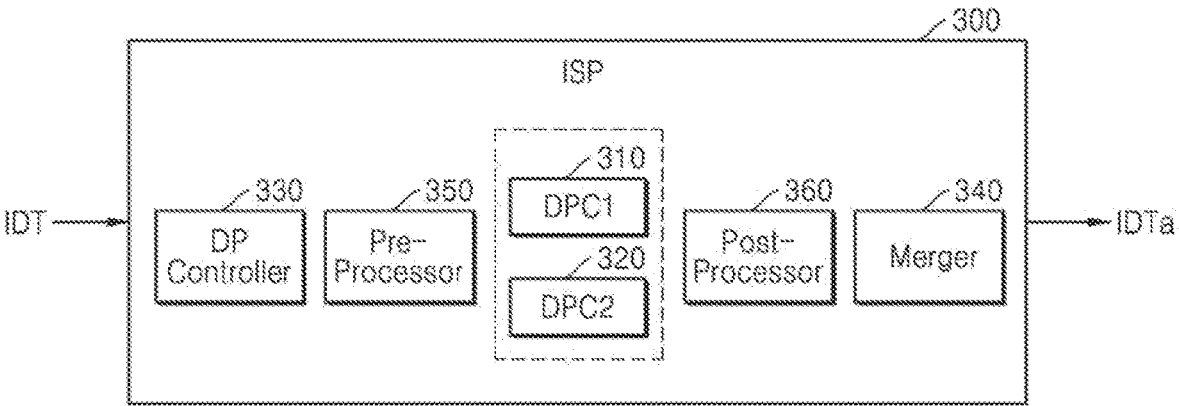
FIG. 8 is a block diagram illustrating components of an image signal processor according to an embodiment.

FIG. 8 is a block diagram illustrating components of an ISP according to an embodiment. Descriptions already provided above are omitted.

Referring to FIG. 8, the ISP 300 may include the defective pixel controller 330, a pre-processor 350, the first defective pixel corrector 310, and the second defective pixel corrector 320. The pre-processor 350 may determine whether or not a cluster of defective pixels corresponds to a first cluster type. The first cluster type may refer to a case in which a pixel value of a cluster of defective pixels needs to be corrected according to the second algorithm. That is, the pre-processor 350 may determine whether or not the cluster of defective pixels needs to be corrected according to the second algorithm.

In an embodiment, the pre-processor 350 may determine whether or not the cluster of defective pixels corresponds to the first cluster type and inform the second defective pixel corrector 320 of a result of the determination. For example, the pre-processor 350 may determine whether or not the cluster of defective pixels corresponds to the first cluster type and generate a determination signal based on the determination. The determination signal may be a signal informing the second defective pixel corrector 320 whether or not the cluster of defective pixels corresponds to the first cluster type.

For example, when the pre-processor 350 determines that the cluster of defective pixels corresponds to the first cluster type, the pre-processor 350 may be implemented to transmit the pixel value of the cluster of defective pixels to the second defective pixel corrector 320. When the pre-processor 350 determines that the cluster of defective pixels does not correspond to the first cluster type, the pre-processor 350 may not transmit the pixel value of the cluster of defective pixels to the second defective pixel corrector 320.

The pre-processor 350 may determine whether or not the cluster of defective pixels corresponds to the first cluster type based on pixel values of pixels included in a determination area. The determination area may be an area having a preset size and including the cluster of defective pixels in a pixel array. For example, the determination area may be an area having a 10×10 pixel size and including the cluster of defective pixels or an area having a 12×12 pixel size and including the cluster of defective pixels. However, the inventive concept is not necessarily limited thereto.

In an embodiment, the pre-processor 350 may determine whether or not the cluster of defective pixels corresponds to the first cluster type according to whether or not at least one of an edge area and a high-frequency area is included in the determination area. The edge area may refer to an area in which a pixel value of a pixel rapidly changes, and the high-frequency area may refer to an area in which a pixel value of a pixel repeatedly changes. The edge area and the high-frequency area may be determined based on the pixel values of the pixels included in the determination area.

When at least one of the edge area and the high-frequency area is included in the determination area, the pre-processor 350 may determine that the pixel value of the cluster of defective pixels included in the determination area needs to be corrected according to the second algorithm. That is, when at least one of the edge area and the high-frequency area is included in the determination area, the pre-processor 350 may determine that the cluster of defective pixels corresponds to the first cluster type.

In an embodiment, the pre-processor 350 may determine whether or not the cluster of defective pixels corresponds to the first cluster type based on a gradient of each of the pixel values of the pixels included in the determination area. The edge area and the high-frequency area may be determined based on the gradients of the pixel values of the pixels included in the determination area. For example, whether or not the cluster of defective pixels corresponds to the first cluster type may be determined based on at least one of an intra gradient and an inter gradient. The intra gradient and the inter gradient are described below in detail with reference to FIGS. 10 and 11. Although FIG. 8 illustrates the pre-processor 350 as a separate logic from the defective pixel controller 330, the inventive concept is not necessarily limited thereto, and the pre-processor 350 may be included in the defective pixel controller 330.

The first defective pixel corrector 310 may correct the pixel values of the isolated defective pixel and the cluster of defective pixels. The first defective pixel corrector 310 may correct the pixel value of the cluster of defective pixels according to the first algorithm, regardless of whether or not the cluster of defective pixels corresponds to the first cluster type. However, the inventive concept is not necessarily limited thereto. In some embodiments, when the cluster of defective pixels does not correspond to the first cluster type, the first defective pixel corrector 310 may be implemented to correct the pixel value of the cluster of defective pixels.

The second defective pixel corrector 320 may correct the pixel value of the cluster of defective pixels according to whether or not the cluster of defective pixels corresponds to the first cluster type. The second defective pixel corrector 320 may receive the determination signal from the pre-processor 350 and correct the pixel value of the cluster of defective pixels based on the determination signal.

When the cluster of defective pixels corresponds to the first cluster type, the second defective pixel corrector 320 may correct the pixel value of the cluster of defective pixels according to the second algorithm using a neural network. When it is determined that the cluster of defective pixels does not correspond to the first cluster type, the second defective pixel corrector 320 may not correct the pixel value of the cluster of defective pixels.

The pixel array may include a plurality of clusters of defective pixels, and pixel values of the plurality of clusters of defective pixels may be successively transmitted to the ISP 300. When the pixel values of all the clustered defective pixels are corrected according to the second algorithm, the amount of computation may be large, and it may be difficult to perform the defective pixel correction in real time. Because the image sensor according to the inventive concept may determine the type of the cluster of defective pixels and correct the pixel value of the cluster of defective pixels by using a neural network when the type of the cluster of defective pixels corresponds to the first cluster type, the number of cluster of defective pixels corrected using the neural network may be reduced. Accordingly, the amount of computation and power consumption required to perform defective pixel correction may be reduced.

Referring to FIG. 8, the ISP 300 may further include a post-processor 360. The post-processor 360 may determine the reliability of the second defective pixel corrector 320. That is, the post-processor 360 may determine the reliability of the second algorithm. The second defective pixel corrector 320 may include a deep learning model trained to correct the cluster of defective pixels and may correct the pixel value of the cluster of defective pixels by using the deep learning model. Because the deep learning model is trained based on training data of various cases including cluster defective pixels, the reliability of the deep learning model may be reduced in the case of correcting the pixel value of an untrained cluster of defective pixels by using the deep learning model. Accordingly, the reliability of the second defective pixel corrector 320 needs to be determined.

The post-processor 360 may determine the reliability of the second defective pixel corrector 320 based on the second pixel data generated by correcting the pixel value of the cluster of defective pixels. In an embodiment, the post-processor 360 may determine the reliability of the second defective pixel corrector 320 based on first pixel data and second pixel data from the first defective pixel corrector 310.

The post-processor 360 may determine the reliability of the second defective pixel corrector 320 by comparing the first pixel data and the second pixel data corresponding to the cluster of defective pixels. For example, when a difference between the first pixel data and the second pixel data corresponding to the cluster of defective pixels is greater than or equal to a preset value, the post-processor 360 may determine that the reliability of the second defective pixel corrector 320 is low or that the second defective pixel corrector 320 is unreliable. When the difference between the first pixel data and the second pixel data corresponding to the cluster of defective pixels is less than the preset value, the post-processor 360 may determine that the reliability of the second defective pixel corrector 320 is high or that the second defective pixel corrector 320 is reliable.

In an embodiment, the post-processor 360 may determine the reliability of the second defective pixel corrector 320 based on pixel values of neighboring pixels of the cluster of defective pixels and the second pixel data corresponding to the cluster of defective pixels. For example, when a difference between the pixel values of the neighboring pixels of the cluster of defective pixels and the second pixel data is greater than or equal to a preset value, the post-processor 360 may determine that the reliability of the second defective pixel corrector 320 is low or that the second defective pixel corrector 320 is unreliable. When the difference between the pixel values of the neighboring pixels of the cluster of defective pixels and the second pixel data is less than the preset value, the post-processor 360 may determine that the reliability of the second defective pixel corrector 320 is high or that the second defective pixel corrector 320 is reliable.

The merger 340 may generate corrected image data based on the determination of the reliability of the second defective pixel corrector 320. When the post-processor 360 determines that the second defective pixel corrector 320 is reliable, the merger 340 may generate corrected image data based on at least one of the second pixel data and the first pixel data corresponding to the cluster of defective pixels. For example, when the second defective pixel corrector 320 is reliable, the merger 340 may generate corrected image data by replacing the pixel value of the cluster of defective pixels with the second pixel data.

When the post-processor 360 determines that the second defective pixel corrector 320 is unreliable, the merger 340 may generate corrected image data based on the first pixel data corresponding to the cluster of defective pixels. When the second defective pixel corrector 320 is unreliable, the merger 340 may generate corrected image data by replacing the pixel value of the cluster of defective pixels with the first pixel data corresponding to the cluster of defective pixels.

Because the image sensor according to an embodiment determines the reliability of the second defective pixel corrector 320 and generates corrected image data based on the reliability of the second defective pixel corrector 320, pixel values of defective pixels may be accurately corrected. Accordingly, the performance of the image sensor for defective pixel correction may be improved.

Figure 9A:
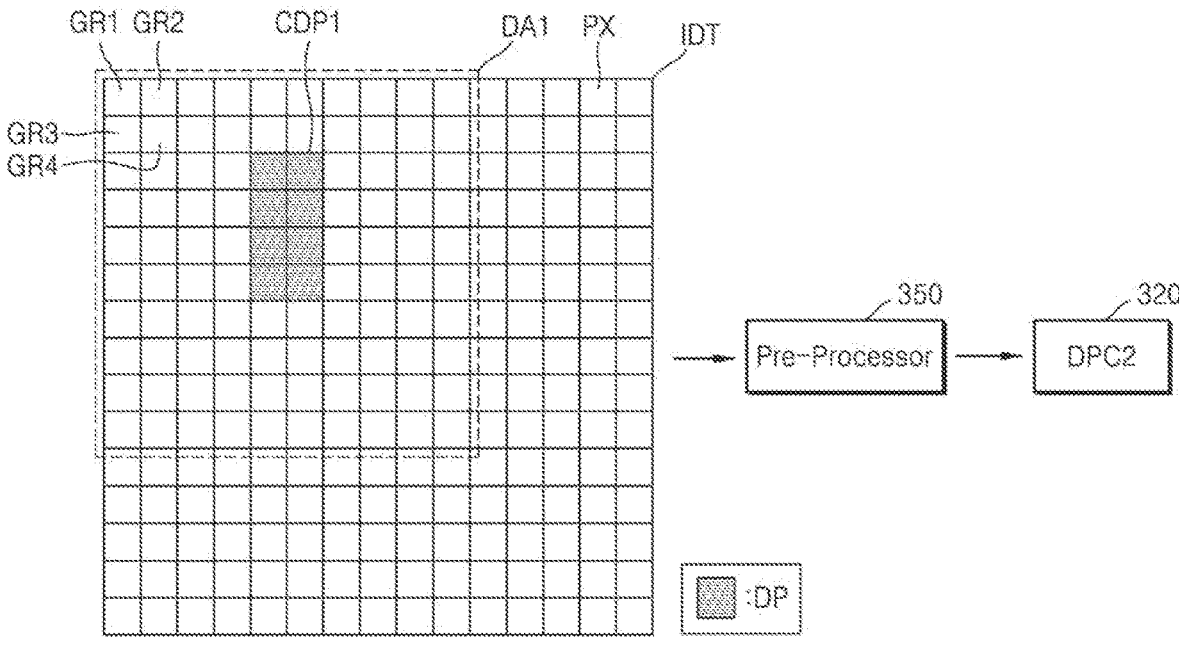
FIG. 9A is a diagram illustrating an operation of a pre-processor according to an embodiment.

FIG. 9A is a diagram illustrating an operation of a pre-processor according to an embodiment. In FIG. 9A, each of a plurality of pixels of a pixel array is illustrated in correspondence to the image data IDT. Because the pre-processor 350 and the second defective pixel corrector 320 of FIG. 9A respectively correspond to the pre-processor 350 and the second defective pixel corrector 320 of FIG. 8, redundant descriptions thereof are omitted.

The pre-processor 350 may determine whether or not a cluster of defective pixels corresponds to the first cluster type. The pre-processor 350 may determine whether or not the cluster of defective pixels needs to be corrected according to the second algorithm. In an embodiment, the pre-processor 350 may determine whether or not the cluster of defective pixels corresponds to the first cluster type and inform the second defective pixel corrector 320 of a result of the determination. For example, the pre-processor 350 may determine whether or not the cluster of defective pixels corresponds to the first cluster type and generate a determination signal based on the determination, or the pre-processor 350 may be implemented to transmit the pixel value of the cluster of defective pixels to the second defective pixel corrector 320. Descriptions of FIG. 9A are provided under the assumption that the pixel value of the cluster of defective pixels is transmitted to the second defective pixel corrector 320 according to whether or not the cluster of defective pixels corresponds to the first cluster type.

The pre-processor 350 may determine whether or not the cluster of defective pixels corresponds to the first cluster type based on pixel values of pixels included in a first determination area DA1. The first determination area DA1 may be an area having a preset size and including a first cluster of defective pixels CDP1 in a pixel array. For example, the first determination area DA1 may be an area having a 10×10 pixel size, but the inventive concept is not necessarily limited thereto.

In an embodiment, the pre-processor 350 may determine whether or not the first cluster of defective pixels CDP1 corresponds to the first cluster type according to whether or not at least one of an edge area and a high-frequency area is included in the first determination area DA1. The edge area and the high-frequency area may be determined based on the pixel values of the pixels included in the determination area.

The edge area and the high-frequency area may be determined based on a gradient of each of the pixel values of the pixels included in the first determination area DA1. For example, among the pixel values of the pixels included in the first determination area DA1, a difference between a pixel value of a first green pixel Gr1 and each of pixel values of a first green pixel Gr2, a first green pixel Gr3, and a first green pixel Gr4 is greater than or equal to a preset threshold value, and thus, the pre-processor 350 may determine the first green pixel Gr1 as the edge area.

Because the edge area is included in the first determination area DA1, the pre-processor 350 may determine that the pixel value of the first cluster of defective pixels CDP1 corresponds to the first cluster type. The pre-processor 350 may transmit the pixel value of the first cluster of defective pixels CDP1 to the second defective pixel corrector 320. The second defective pixel corrector 320 may correct the pixel value of the first cluster of defective pixels CDP1 by using a neural network.

Figure 9B:
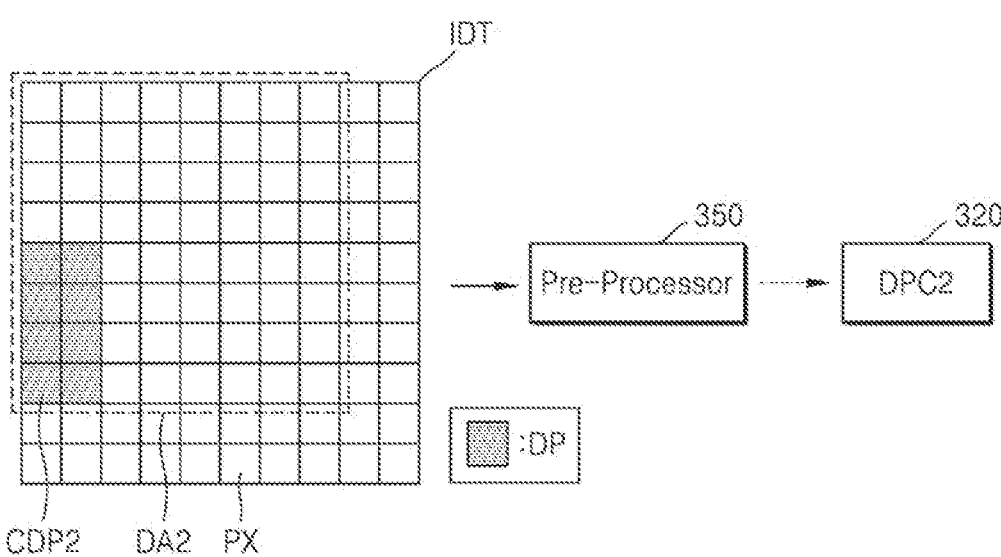
FIG. 9B is a diagram illustrating an operation of a pre-processor according to an embodiment.

FIG. 9B is a diagram illustrating an operation of a pre-processor according to an embodiment. FIG. 9B illustrates a case in which a pixel value of a cluster of defective pixels is not transmitted to the second defective pixel corrector 320. Descriptions already provided with reference to FIG. 9A are omitted.

The pre-processor 350 may determine whether or not the cluster of defective pixels corresponds to the first cluster type based on pixel values of pixels included in a second determination area DA2. The second determination area DA2 may be an area having a preset size and including a second cluster of defective pixels CDP2 in a pixel array. For example, the second determination area DA2 may be an area having a 8×8 pixel size, but the inventive concept is not necessarily limited thereto.

In an embodiment, the pre-processor 350 may determine whether or not the second cluster of defective pixels CDP2 corresponds to the first cluster type according to whether or not at least one of an edge area and a high-frequency area is included in the second determination area DA2. When the second determination area DA2 includes only a flat area other than an edge area and a high-frequency area, the pre-processor 350 may determine that the second cluster of defective pixels CDP2 does not correspond to the first cluster type.

For example, when the second determination area DA2 includes a flare area, the pre-processor 350 may determine that the second cluster of defective pixels CDP2 does not correspond to the first cluster type. The flare area may refer to, when an object is imaged with strong light, a portion in which an image appears bright and which is different from a portion in which the object appears. The flare area may be determined based on a gradient of each of the pixel values of the pixels included in the second determination area DA2.

For example, an edge area and a high-frequency area may not be included in the second determination area DA2. The pre-processor 350 may determine that the pixel value of the second cluster of defective pixels CDP2 does not correspond to the first cluster type. That is, the pixel value of the second cluster of defective pixels CDP2 may not need to be corrected according to the second algorithm. The pre-processor 350 may not transmit the pixel value of the second cluster of defective pixels CDP2 to the second defective pixel corrector 320. The second defective pixel corrector 320 may not correct the pixel value of the second cluster of defective pixels CDP2.

Figure 10:
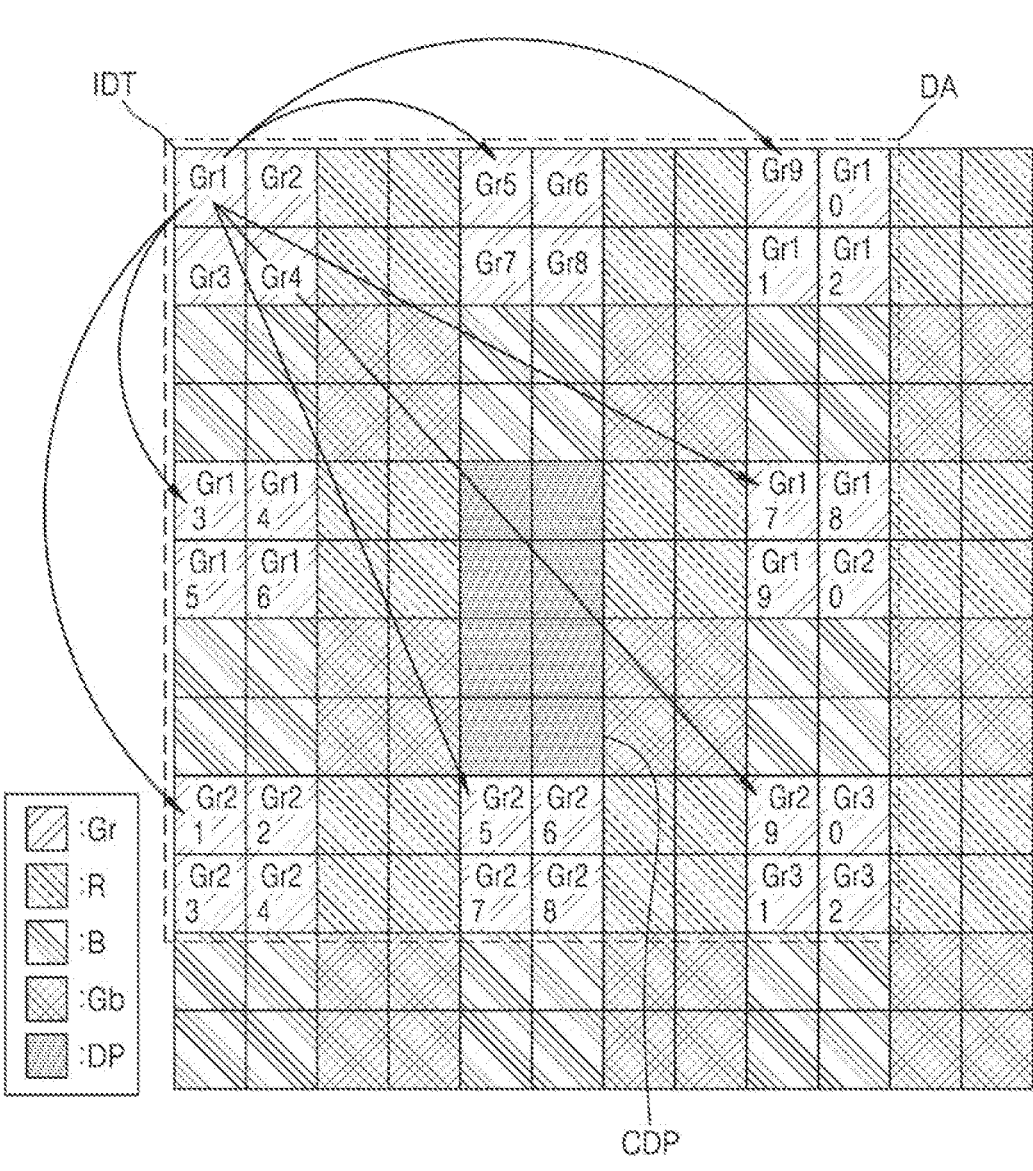
FIG. 10 is a diagram illustrating an inter gradient according to an embodiment.

FIG. 10 is a diagram illustrating an inter gradient according to an embodiment. In FIG. 10, each of a plurality of pixels of a pixel array is illustrated in correspondence to the image data IDT.

A pre-processor (e.g., the pre-processor 350 of FIG. 8) may determine whether or not the cluster of defective pixels CDP corresponds to the first cluster type based on a gradient of each of pixel values of pixels included in a determination area DA. Referring to FIG. 10, the determination area DA may have a 10×10 pixel size and include the cluster of defective pixels CDP.

The pre-processor may calculate a gradient of a target pixel. The target pixel may refer to a pixel that becomes a target for calculating a gradient of a pixel value within the determination area DA. The pre-processor may calculate an inter gradient of the target pixel. The inter gradient of the target pixel may be calculated based on a pixel value of each of pixels in the same color channel as the target pixel, among the pixels included in the determination area DA.

For example, it is assumed that the target pixel is a first green pixel Gr1. The pre-processor may calculate an inter gradient of the first green pixel Gr1. The pre-processor may calculate the inter gradient of the first green pixel Gr1 based on a pixel value of each of pixels in the same color channel as the first green pixel Gr1. A pixel in the same color channel as the first green pixel Gr1 may be a pixel located at a position corresponding to the first green pixel Gr1 among first green pixels. A first green pixel Gr5, a first green pixel Gr9, the first green pixel Gr13, a first green pixel Gr17, a first green pixel Gr21, a first green pixel Gr25, and a first green pixel Gr9 may be pixels in the same color channel as the first green pixel Gr1. The pre-processor may calculate the inter gradient of the first green pixel Gr1 based on a pixel value of each of the first green pixel Gr5, the first green pixel Gr9, the first green pixel Gr13, the first green pixel Gr17, the first green pixel Gr21, the first green pixel Gr25, and the first green pixel Gr9.

The pre-processor may determine whether or not the cluster of defective pixels CDP corresponds to the first cluster type based on the inter gradient of the target pixel. The pre-processor may calculate an inter gradient of each of the pixels included in the determination area DA and determine whether or not at least one of an edge area and a high-frequency area is included in the determination area DA.

In an embodiment, when there is a pixel having an inter gradient greater than or equal to a threshold value among the pixels included in the determination area DA, the pre-processor may determine that the cluster of defective pixels CDP corresponds to the first cluster type. Among the pixels included in the determination area DA, the pixel having an inter gradient greater than or equal to the threshold value may be at least one of the edge area and the high-frequency area. For example, it is assumed that the threshold value is 0.12. When the inter gradient of the first green pixel Gr1 is greater than or equal to 0.12, the pre-processor may determine that the cluster of defective pixels CDP corresponds to the first cluster type because the first green pixel Gr1 corresponds to the edge area.

When the inter gradient of each of the pixels included in the determination area DA is less than the threshold value, the pre-processor may determine that the edge area and the high-frequency area are not included in the determination area DA. The pre-processor may determine that the cluster of defective pixels CDP does not correspond to the first cluster type.

Figure 11:
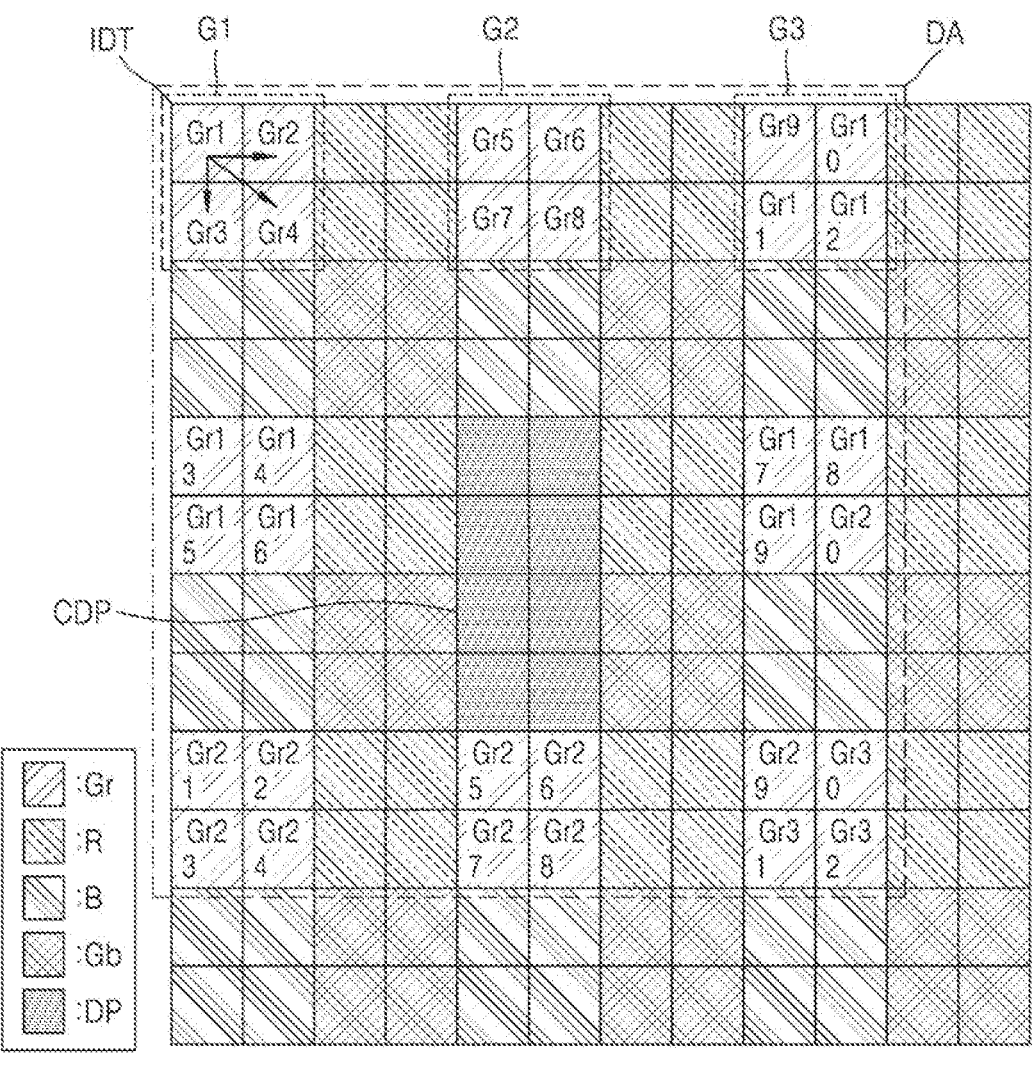
FIG. 11 is a diagram illustrating an inter gradient according to an embodiment.

FIG. 11 is a diagram illustrating an inter gradient according to an embodiment. In FIG. 11, each of a plurality of pixels of a pixel array is illustrated in correspondence to the image data IDT. Descriptions already provided with reference to FIG. 10 are omitted.

Referring to FIG. 10, the determination area DA may have a 10×10 pixel size and include the cluster of defective pixels CDP. The determination area DA may include a plurality of pixel groups in which pixels of the same color are grouped together. For example, the determination area DA may include a first group G1, a second group G2, and a third group G3 in which first green pixels are grouped together. The first group G1 may include the first green pixel Gr1, the first green pixel Gr2, the first green pixel Gr3, and the first green pixel Gr4.

The pre-processor may calculate an intra gradient of a target pixel. The intra gradient of the target pixel may be calculated based on a pixel value of each of pixels included in a target pixel group including the target pixel, among the plurality of pixel groups. For example, when the target pixel is the first green pixel Gr1, the target pixel group may be the first group G1.

It is assumed that the target pixel is the first green pixel Gr1. The pre-processor may calculate an intra gradient of the first green pixel Gr1. The pre-processor may calculate the intra gradient of the first green pixel Gr1 based on a pixel value of each of pixels in the same pixel group as the first green pixel Gr1. The pixels in the same pixel group as the first green pixel Gr1 may include the first green pixel Gr2, the first green pixel Gr3, and the first green pixel Gr4. The pre-processor may calculate the intra gradient of the pixel value of the first green pixel Gr1 based on a pixel value of each of the first green pixel Gr2, the first green pixel Gr3, and the first green pixel Gr4.

The pre-processor may determine whether or not the cluster of defective pixels CDP corresponds to the first cluster type based on the intra gradient of the target pixel. The pre-processor may calculate an intra gradient of each of the pixels included in the determination area DA and determine whether or not at least one of an edge area and a high-frequency area is included in the determination area DA.

In an embodiment, when there is a pixel having an intra gradient greater than or equal to a threshold value among the pixels included in the determination area DA, the pre-processor may determine that the cluster of defective pixels CDP corresponds to the first cluster type. Among the pixels included in the determination area DA, the pixel having an intra gradient greater than or equal to the threshold value may be at least one of the edge area and the high-frequency area. For example, it is assumed that the threshold value is 0.12. When the intra gradient of the first green pixel Gr1 is greater than or equal to 0.12, the pre-processor may determine that the cluster of defective pixels CDP corresponds to the first cluster type because the first green pixel Gr1 corresponds to the edge area.

When the intra gradient of each of the pixels included in the determination area DA is less than the threshold value, the pre-processor may determine that the edge area and the high-frequency area are not included in the determination area DA. The pre-processor may determine that the cluster of defective pixels CDP does not correspond to the first cluster type.

In an embodiment, when at least one of the inter gradient and the intra gradient of each of the pixels included in the determination area DA is greater than or equal to the threshold value, the pre-processor may determine that the cluster of defective pixels CDP corresponds to the first cluster type. When the inter gradient of each of the pixels included in the determination area DA is less than the threshold value and the intra gradient of each of the pixels included in the determination area DA is less than the threshold value, the pre-processor may determine that the cluster of defective pixels CDP does not correspond to the first cluster type.

When the inter gradient and the intra gradient of each of the pixels included in the determination area DA are less than the threshold value, the determination area DA includes only a flat area, and thus, the pre-processor may determine that the cluster of defective pixels CDP does not correspond to the first cluster type. When only a flat area is present in the determination area DA, the pixel value of the cluster of defective pixels CDP may be corrected according to the first algorithm and may not be corrected according to the second algorithm.

In an embodiment, the pre-processor may determine whether or not a flare area is included in the determination area DA. When a flare area is in the determination area DA, the pre-processor may determine that the cluster of defective pixels CDP does not correspond to the first cluster type. The pre-processor may determine the flare area based on an inter gradient and an intra gradient of each of the pixels included in the determination area DA.

Among the pixels included in the determination area DA, a pixel having an inter gradient less than a first threshold value and an intra gradient greater than or equal to a second threshold value may correspond to the flare area. For example, it is assumed that the first threshold value is 0.12 and the second threshold value is 0.85. When the inter gradient of the first green pixel Gr1 is less than 0.12 and the intra gradient of the first green pixel Gr1 is greater than or equal to 0.85, the pre-processor may determine that the first green pixel Gr1 corresponds to the flare area. The pre-processor may determine that the cluster of defective pixels CDP does not correspond to the first cluster type.

FIG. 12 is a flowchart illustrating an operating method of an image sensor according to an embodiment.

In operation S1210, the image sensor may generate image data. The image sensor may include a plurality of pixels, and the plurality of pixels may be arranged in a matrix. The plurality of pixels may convert a received optical signal into an electrical signal. The image sensor may convert the electrical signal generated from the plurality of pixels into image data including pixel values of the plurality of pixels. The pixel values may be digital values.

In operation S1220, the image sensor may distinguish a cluster of defective pixels and an isolated defective pixel from the image data based on location information. The image data may include pixel values caused by defective pixels. A defective pixel may refer to a pixel that does not have a pixel value corresponding to a particular gray level when a difference in pixel value between the pixel and neighboring pixels is greater than or equal to a reference value, or when the image data indicates an image of the gray level.

The defective pixels may include a cluster of defective pixels and an isolated defective pixel. The cluster of defective pixels may refer to a pixel generated by forming a cluster of a plurality of adjacent defective pixels. Among the defective pixels, a pixel that is not a cluster of defective pixels may be referred to as an isolated defective pixel. The image sensor may distinguish the cluster of defective pixels and the isolated defective pixel based on location information. The location information may indicate locations of the cluster of defective pixels and the isolated defective pixel among the plurality of pixels and may be pre-stored in the image sensor. For example, the image sensor may distinguish a pixel value of the cluster of defective pixels and a pixel value of the isolated defective pixel based on the location information. For example, the image sensor may distinguish location information of the cluster of defective pixels and location information of the isolated defective pixel.

In operation S1230, the image sensor may perform defective pixel correction on the image data. The image sensor may correct the pixel values of the defective pixels among the pixel values of the plurality of pixels included in image data. The image sensor may correct the pixel value of the isolated defective pixel according to a first algorithm and correct the pixel value of the cluster of defective pixels according to at least one of the first algorithm and a second algorithm.

The image sensor may correct a pixel value of each defective pixel according to the first algorithm. The image sensor may correct the pixel value of the cluster of defective pixels and the pixel value of the isolated defective pixel according to the first algorithm. The first algorithm may be an algorithm that corrects pixel values of defective pixels by using pixel values of neighboring pixels of each of the defective pixels and may use hand-crafted features. The image sensor may correct the pixel value of the cluster of defective pixels according to the first algorithm using pixel values of neighboring pixels of the cluster of defective pixels. The image sensor may correct the pixel value of the isolated defective pixel according to the first algorithm using pixel values of neighboring pixels of the isolated defective pixel.

The image sensor may correct the pixel value of the cluster of defective pixels according to the second algorithm. The second algorithm may be an algorithm using a neural network trained to correct the cluster of defective pixels and may be different from the first algorithm. The image sensor may correct the pixel value of the cluster of defective pixels by using the neural network.

In an embodiment, the image sensor may determine whether or not the pixel value of the cluster of defective pixels corresponds to a first cluster type that needs to be corrected using the neural network. When it is determined that the cluster of defective pixels corresponds to the first cluster type, the image sensor may correct the pixel value of the cluster of defective pixels according to the second algorithm.

The image sensor may determine whether or not the cluster of defective pixels corresponds to the first cluster type based on pixel values of pixels included in a determination area. The determination area may be an area having a preset size and including the cluster of defective pixels in a pixel array. The image sensor may determine whether or not the cluster of defective pixels corresponds to the first cluster type according to whether or not at least one of an edge area and a high-frequency area is included in the determination area. For example, when at least one of the edge area and the high-frequency area is included in the determination area, the image sensor may determine that the pixel value of the cluster of defective pixels included in the determination area needs to be corrected according to the second algorithm. The image sensor may determine whether or not the cluster of defective pixels corresponds to the first cluster type based on a gradient of each of the pixel values of the pixels included in the determination area.

Figure 13:
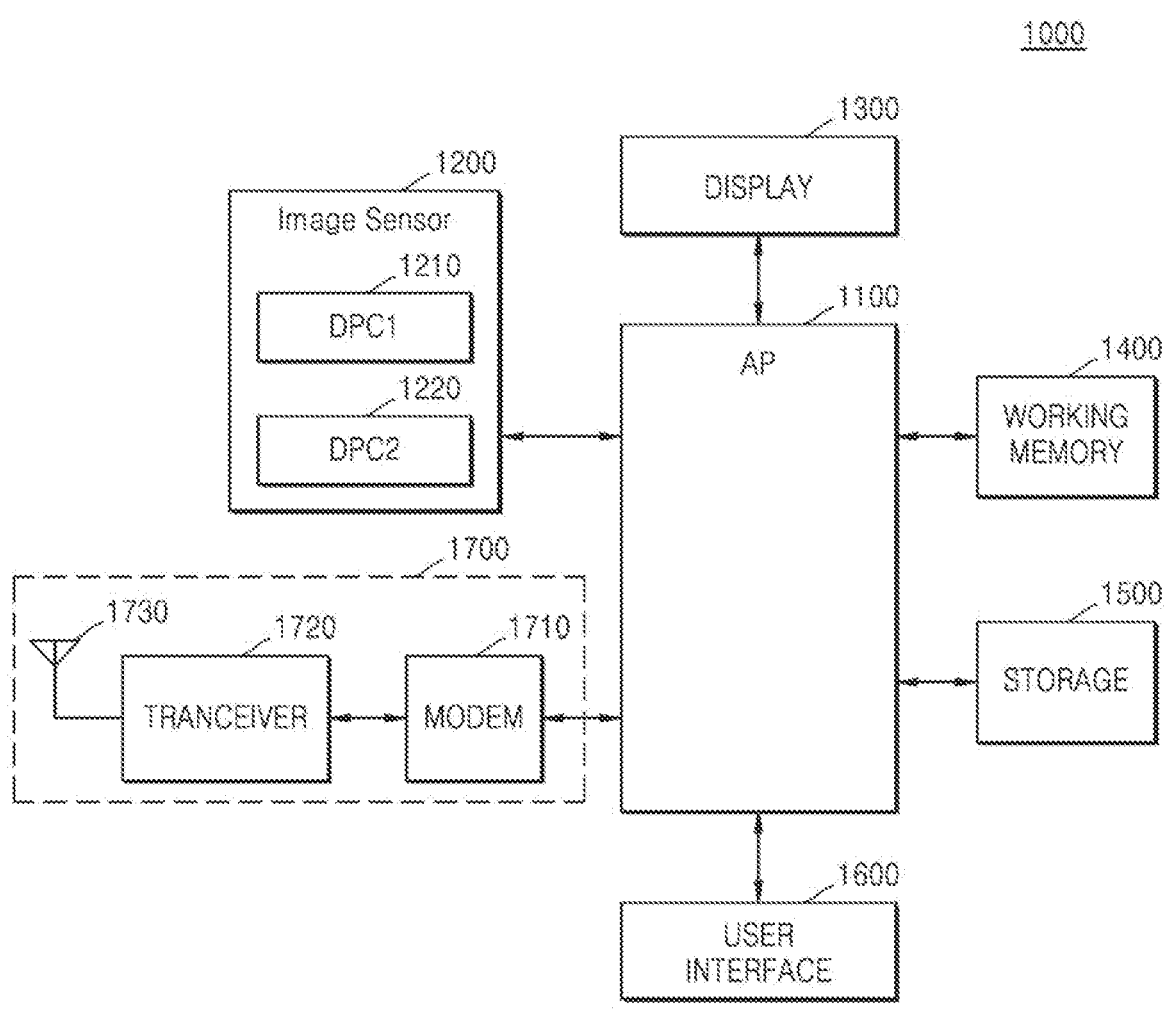
FIG. 13 is a block diagram illustrating an electronic device according to an embodiment.

FIG. 13 is a block diagram illustrating an electronic device according to an embodiment. For example, an electronic device 1000 may be a portable terminal.

Referring to FIG. 13, the electronic device according to an embodiment may include an application processor 1100, an image sensor 1200, a display device 1300, a working memory 1400, a storage 1500, a user interface 1600, and a wireless transceiver 1700. Descriptions of the image sensor and the operating method of the image sensor according to the embodiments provided with reference to FIGS. 1 to 12 may be applied to the image sensor 1200.

The application processor 1100 may control the overall operation of the electronic device 1000 and may be provided as a system-on-chip (SoC) that drives an application program, an operating system, etc.

The application processor 1100 may receive output data from the image sensor 1200.

The image sensor 1200 may generate image data, for example, image data, based on a received optical signal and provide the image data to the application processor 1100. The image sensor 1200 may perform defective pixel correction. The image sensor 1200 may include a first defective pixel corrector 1210 and a second defective pixel corrector 1220.

The first defective pixel corrector 1210 may correct a defective pixel value by using pixel values of neighboring pixels of each of a plurality of pixels of the image sensor 1200. The first defective pixel corrector 1210 may correct pixel values of an isolated defective pixel and a cluster of defective pixels. The second defective pixel corrector 1220 may correct the pixel value of the cluster of defective pixels included in image data by using a neural network trained to correct the cluster of defective pixels.

While FIG. 13 illustrates the first defective pixel corrector 1210 and the second defective pixel corrector 1220 being part of the image sensor 1200, embodiments of the present disclosure are not limited to this configuration. For example, either one or both of the first defective pixel corrector 1210 and the second defective pixel corrector 1220 may be integrated into the application processor 1100 located outside the image sensor 1200.

The working memory 1400 may be implemented as volatile memory, such as dynamic random access memory (DRAM) or static RAM (SRAM), or non-volatile resistive memory, such as ferroelectric RAM (FeRAM), resistive RAM (RRAM), or phase-change RAM (PRAM). The working memory 1400 may store programs and/or data processed or executed by the application processor 1100.

The storage 1500 may be implemented as a nonvolatile memory device such as a NAND flash or a resistive memory. For example, the storage 1500 may be provided as a memory card (e.g., a multi-media card (MMC), an embedded MMC (eMMC), a secure digital (SD) card, or a micro SD card) or the like. The storage 1500 may store data and/or programs for an execution algorithm for controlling an image processing operation of the image sensor 1200, and when the image processing operation is performed, the data and/or programs may be loaded to the working memory 1400. In an embodiment, the storage 1500 may store output image data generated by the image sensor 1200, for example, corrected image data or post-processed image data.

The user interface 1600 may be implemented as various devices capable of receiving a user input, such as a keyboard, a curtain key panel, a touch panel, a fingerprint sensor, and a microphone. The user interface 1600 may receive a user input and provide a signal corresponding to the received user input to the application processor 1100.

The wireless transceiver 1700 may include a transceiver 1720, a modem 1710, and an antenna 1730.

While the inventive concept has been particularly shown and described with reference to embodiments thereof, it will be understood that various changes in form and details may be made therein without departing from the spirit and scope of the following claims.

What is claimed is:

1. An electronic device comprising:
   a pixel array including a plurality of pixels, each of the plurality of pixels being configured to convert a received optical signal into an electrical signal;
   a readout circuit configured to convert the electrical signal into image data and output the image data, the image data including pixel values of the plurality of pixels; and
   one or more processors comprising:
      a first defective pixel corrector configured to generate first pixel data by correcting pixel values of clustered defective pixels and one or more additional defective pixel, among the plurality of pixels, by using pixel values of neighboring pixels of each of the clustered defective pixels and the one or more additional defective pixels;
      a second defective pixel corrector configured to generate second pixel data by correcting the pixel values of the clustered defective pixels defective pixels by using via a neural network; and
      a merger configured to generate corrected image data based on the first pixel data and the second pixel data.

2. The electronic device of claim 1, wherein the one or more processors further comprises: a pre-processor configured to determine whether or not the clustered defective pixels corresponds to a first cluster type, based on pixel values of pixels located within a determination area of the pixel array, which encompasses the clustered defective pixels.

3. The electronic device of claim 2, wherein the pre-processor is further configured to determine whether or not the clustered defective pixels corresponds to the first cluster type based on a gradient of each of the pixel values of the pixels located within the determination area.

4. The electronic device of claim 3, wherein the pre-processor is further configured to calculate an inter gradient of a target pixel based on a pixel value of each of pixels in a same color channel as the target pixel, among the pixels located within the determination area.

5. The electronic device of claim 3, wherein the determination area further includes a plurality of pixel groups in which pixels of a same color are grouped together, and the pre-processor is further configured to calculate an intra gradient of a target pixel based on a pixel value of each of pixels included in a target pixel group including the target pixel, among the plurality of pixel groups.

6. The electronic device of claim 3, wherein the pre-processor is further configured to determine that the clustered defective pixels corresponds to the first cluster type when at least one of an inter gradient and an intra gradient of each of the pixels located within the determination area is greater than or equal to a threshold value.

7. The electronic device of claim 2, wherein, when the clustered defective pixels corresponds to the first cluster type, the second defective pixel corrector is further configured to correct the pixel value of the clustered defective pixels by using the neural network.

8. The electronic device of claim 1, wherein the one or more processors further comprises a post-processor configured to determine reliability of the second defective pixel corrector, wherein the post-processor is further configured to determine the reliability of the second defective pixel corrector based on a comparison between the first pixel data and the second pixel data each corresponding to the clustered defective pixels.

9. The electronic device of claim 1, further comprising a post- processor configured to determine reliability of the second defective pixel corrector, wherein the post-processor is further configured to determine the reliability of the second defective pixel corrector based on pixel values of neighboring pixels of the clustered defective pixels and the second pixel data corresponding to the clustered defective pixels.

10. The electronic device of claim 1, wherein the first defective pixel corrector is further configured to correct the pixel values of the clustered defective pixels and the one or more additional defective pixels based on at least one of a mean filter, a median filter, and a weighted mean filter.

11. An electronic device comprising:

a pixel array including a plurality of pixels, each of the plurality of pixels being configured to convert a received optical signal into an electrical signal;

a readout circuit configured to convert the electrical signal into image data and output the image data, the image data including pixel values of the plurality of pixels; and one or more processors configured to correct pixel values of clustered defective pixels and one or more additional defective pixels in the image data, based on location information indicating locations of the clustered defective pixels and the one or more additional defective pixels in the pixel array, wherein the one or more processors are further configured to;

correct the pixel values of the clustered defective pixels and the one or more additional defective pixels, according to a first algorithm using pixel values of neighboring pixels of the clustered defective pixels and the one or more additional defective pixels, to generate first pixel data;

correct the pixel values of the clustered defective pixels based on a second algorithm using a neural network, to generate second pixel data; and generate corrected image data based on the first pixel data and the second pixel data.

12. The electronic device of claim 11, wherein the one or more processors are further configured to:

determine whether or not the pixel values of the clustered defective pixels need to be corrected according to the second algorithm; and when it is determined that the pixel values of the clustered defective pixels need to be corrected according to the second algorithm, correct the pixel values of the clustered defective pixels according to the second algorithm.

13. The electronic device of claim 12, wherein the one or more processors are further configured to, when at least one of an edge area and a high-frequency area is included in a determination area having a preset size and including the clustered defective pixels in the pixel array, determine that the pixel values of the clustered defective pixels need to be corrected according to the second algorithm.

14. The electronic device of claim 11, wherein the one or more processors are further configured to determine reliability of the second algorithm based on a comparison between the first pixel data and the second pixel data each corresponding to the clustered defective pixels.

15. The electronic device of claim 14, wherein the one or more processors are further configured to:

when it is determined that the second algorithm is reliable, generate the corrected image data based on the second pixel data corresponding to the clustered defective pixels; and when it is determined that the second algorithm is not reliable, select the first pixel data corresponding to the clustered defective pixels, instead of the second pixel data, and generate the corrected image data based on the first pixel data.

16. An operating method of an electronic device including a plurality of pixels, the operating method comprising:

generating image data including pixel values of the plurality of pixels based on an electrical signal obtained by converting a received optical signal;

distinguishing clustered defective pixels from an additional defective pixels in the image data based on location information indicating locations of the clustered defective pixels and the one or more additional defective pixels among the plurality of pixels; and generating first pixel data by correcting pixel values of the one or more additional defective pixels and the clustered defective pixels according to a first algorithm;

generate second pixel data by correcting the pixel values of the clustered defective pixels according a second algorithm that is different from the first algorithm and uses a neural network; and generating corrected image data based on the first pixel data and the second pixel data.

* * * * *